United States Patent
Hayashi

(10) Patent No.: US 6,434,323 B1
(45) Date of Patent: Aug. 13, 2002

(54) DIGITAL INFORMATION RECORDING/ REPRODUCTION APPARATUS AND DIGITAL INFORMATION RECORDING/ REPRODUCTION METHOD

(75) Inventor: Yoshiaki Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/092,096

(22) Filed: Jun. 5, 1998

(30) Foreign Application Priority Data

Jun. 6, 1997 (JP) ................................................ 9-149441

(51) Int. Cl.⁷ .......................... H04N 5/76; H04N 5/781; H04N 5/782
(52) U.S. Cl. ........................ 386/104; 386/106; 386/46
(58) Field of Search ................................ 386/104, 105, 386/106, 125, 126, 124, 46, 52, 54, 4, 40, 45, 39, 1, 94; 360/31, 69, 90, 13, 32; H04N 5/76, 5/781, 5/782

(56) References Cited

U.S. PATENT DOCUMENTS

| | | | | |
|---|---|---|---|---|
| 5,483,491 A | * | 1/1996 | Yoshioka et al. | |
| 5,517,321 A | * | 5/1996 | Yoshida | |
| 5,602,649 A | * | 2/1997 | Shin | |
| 6,094,693 A | * | 7/2000 | Haneda | |

* cited by examiner

*Primary Examiner*—Robert Chevalier
(74) *Attorney, Agent, or Firm*—Frommer Lawrence & Haug LLP; William S. Fromemr

(57) ABSTRACT

A hybrid recording and/or reproducing apparatus can deal with a readout failure of all or part of AV information on a hard disk by restoring the record by using a backup record which has been saved on a tape, and also can expand the recording capacity as the whole system based on the combination of the hard disk and tape. The apparatus consists of a server which records and reproduces AV information on the hard disk, a tape unit which records and reproduces AV information on the tape, and a control system which controls to save all or part of the AV information to be recorded on the hard disk onto the tape simultaneously to or on expiration of a certain time after the recording of the AV information on the hard disk.

8 Claims, 17 Drawing Sheets

DIGITAL INFORMATION RECORDING/ REPRODUCTION APPARATUS AND DIGITAL INFORMATION RECORDING/ REPRODUCTION METHOD

BACKGROUND OF THE INVENTION

1. Field of the Invention

The present invention relates to a hybrid recording and/or reproducing apparatus and a recording and/or reproducing method which are applied suitably to video recording and/or reproducing apparatus and the like that are required to record and preserve a large quantity of video and audio information and read out the stored information at a high readout speed.

More particularly, the invention relates to a hybrid recording and/or reproducing apparatus and a recording and/or reproducing method which are designed to save for the backup purpose records of a magnetic disk (hard disk), semiconductor memory, optical disk or magneto-optical disk (will be termed generically "disk recording medium" hereinafter) onto a tape recording medium so that in the event of readout failure of all or part of a record on the disk recording medium, the record in the state before the occurrence of readout failure can be restored on the disk recording medium based on the backup record, the apparatus and method also allowing the expansion of the recording capacity as the whole system based on the combination of the disk recording medium and tape recording medium.

2. Description of the Prior Art

In recent years, there have been developed video recording and/or reproducing apparatus used in broadcasting stations and the like in which audio/video signals (digital information) are recorded onto a disk recording medium such as a hard disk at the production of a broadcast program and the record on the recording medium is reproduced at the time of broadcasting.

The disk recording medium used by these video recording and/or reproducing apparatus has a recording capacity as large as several giga-bits and has the ability of information erasion and rewriting and high-speed readout, so that it is suitable for recording and editing information of each complete broadcast program which is broadcast in a tight schedule.

On the other hand, however, the disk recording medium is susceptible to external impact and vibration, and moreover it is more expensive in terms of unit recording capacity as compared with the conventional tape recording medium. The durability of the disk recording medium in long-term use and its usable life time are not yet known. Another problem of the disk recording medium left unsolved is how to deal with the emergence of accidental failure, e.g., data read error.

On this account, two recording mediums including active one and spare one are prepared for the enhanced reliability of operation in most cases.

The recording and/or reproducing apparatus which uses the disk recording medium treats records based on index information which indicates the range of recording area used or control information called "file system".

It is desirable obviously for broadcasting stations and the like to preserve all records including video and audio information of broadcast programs produced in the past so that the video and audio information can be reproduced afterward in accordance with the control information. However, preserving all records on the disk recording medium, which is more expensive in terms of unit recording capacity than the tape recording medium, is not practical.

Although a conceivable manner for recording and preserving a large quantity of video and audio information is increasing the number of disk recording mediums run by one recording and/or reproducing apparatus, it will incur an increased medium cost and increased unexpected disk troubles. The control information in the recording and/or reproducing apparatus can possibly fail by some cause, which may cause a disk failure e.g., data read error, resulting possibly in a retrieval failure of all or part of the recorded information.

Recording/reproduction apparatus using semiconductor memories (except for some kinds of semiconductor memories) have their memory records lost if the power supply is shut off.

SUMMARY OF THE INVENTION

Accordingly, it is an object of the present invention to provide a hybrid recording and/or reproducing apparatus and recording and/or reproducing method which are capable of dealing with the readout failure of all or part of a record on a disk recording medium by restoring the record in the state before the occurrence of failure on the disk recording medium based on the backup record which has been saved on a tape recording medium, the apparatus and method also allowing the expansion of the recording capacity as the whole system based on the combination of the disk recording medium and tape recording medium.

In order to achieve the above objective, the inventive hybrid recording and/or reproducing apparatus for recording and/or reproducing digital information including an audio and/or video signal comprises first recording and/or reproducing means which records and/or reproduces the digital information on a nonlinear-access recording medium, second recording and/or reproducing means which records and/or reproduces the digital information on a tape recording medium having a recording capacity which is greater than or equal to the recording capacity of the nonlinear-access recording medium, and control means which controls the first and second recording and/or reproducing means such that same digital information as the digital information recorded on the nonlinear-access recording medium is recorded onto the tape recording medium simultaneously to or on expiration of a certain time after the recording of the digital information onto the nonlinear-access recording medium.

In the inventive hybrid recording and/or reproducing apparatus, the control means monitors records of digital information on the disk recording medium, and in the event of readout failure of all or part of a record on the disk recording medium by some cause, the backup digital information corresponding to the missing record portion is read out of the tape recording medium and recorded onto the disk recording medium automatically so that the record in the state before the occurrence of failure is restored on the disk recording medium.

Accordingly, the inventive apparatus has enhanced reliability for keeping digital information including audio/video signals and computer-based graphic information as compared with conventional recording and/or reproducing apparatus having only disk recording mediums.

DETAILED DESCRIPTION OF THE PREFERRED EMBODIMENTS

An embodiment of the present invention will be explained with reference to the drawings.

Figure 1:
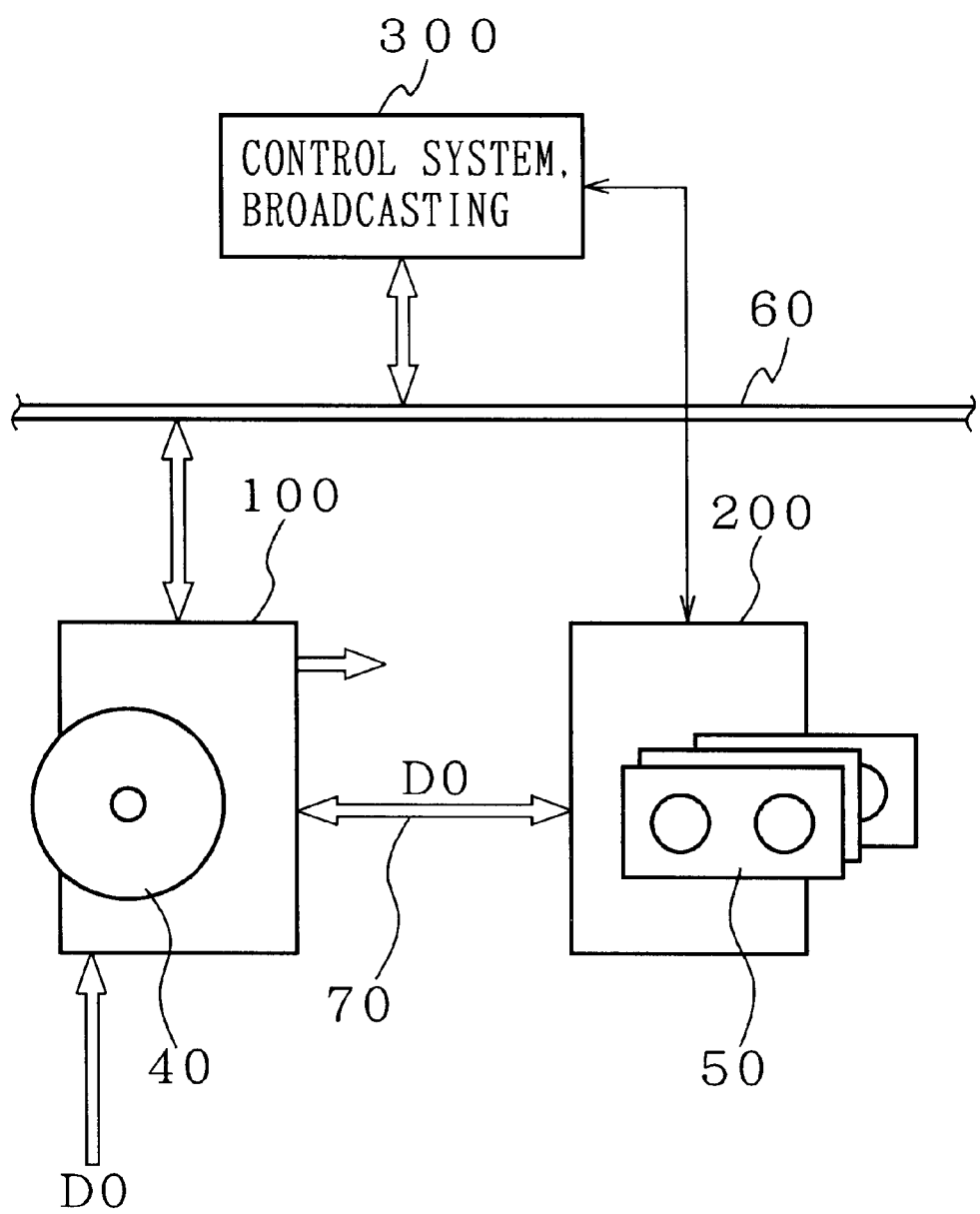
FIG. 1 is a block diagram showing the arrangement of the hybrid recording and/or reproducing apparatus based on an embodiment of this invention.

FIG. 1 shows the arrangement of the hybrid recording and/or reproducing apparatus based on an embodiment of this invention. This hybrid recording and/or reproducing apparatus is designed to save for the backup purpose all records of digital information resident on a disk recording medium onto a tape recording medium, and operate at the occurrence of read error during the reproduction of information from the disk recording medium in edit mode or the like to read out the same information of the read-error portion from the tape recording medium and record it onto the disk recording medium thereby to restore the record on the disk recording medium.

In addition, the apparatus is designed to record multiple records of the disk recording mediums sequentially in the order of reproduction at broadcasting onto one or more tape recording mediums thereby to serialize the tape base.

In FIG. 1, a local area network (will be termed "LAN bus" hereinafter) 60 is connected with a recording and/or reproducing apparatus (will be termed simply "server" hereinafter) 100 which records and reproduces digital information D0, i.e., audio signal and/or video signal, (will be termed generically "AV information" hereinafter) on a nonlinear-access recording medium incorporated in it, e.g., a disk device 40 made up of multiple hard disks. The disk device 40 has a total recording capacity of M hours.

Figure 2A:
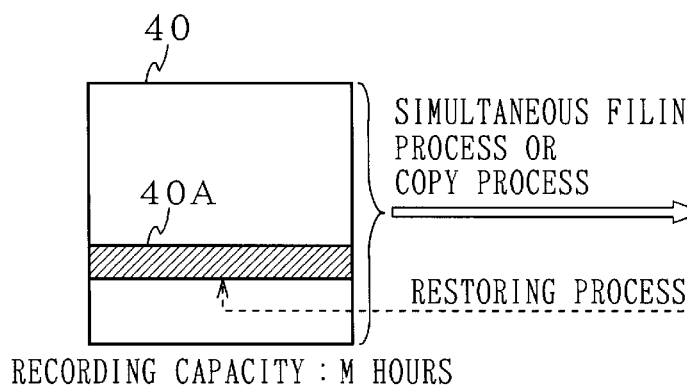
FIGS. 2A and 2B are diagrams comparing the recording capacities of the hard disk and cassette tape.
Figure 2B:
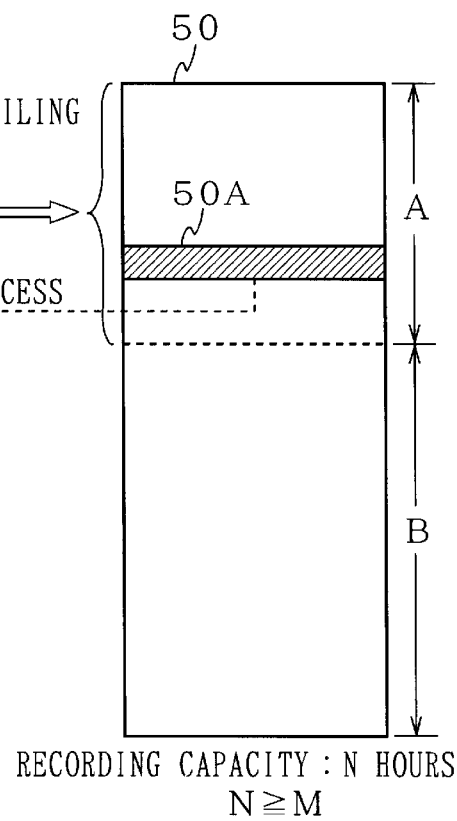

The server 100 is connected through an on-line 70 with a tape auto-changer 200 which is an information recording and/or reproducing device for a tape recording medium. The tape auto-changer 200 consists of multiple shelves (not shown) on which tape recording mediums are stacked, multiple recording and/or reproducing devices which record and reproduce information on tape recording mediums, and a carriage which carries a tape recording medium between the shelves and the recording and/or reproducing devices selectively. The tape auto-changer which is principally the tape recording and/or reproducing device will be called simply "auto-changer" in the following explanation. The AV information D0 is recorded onto and read out of a tape recording medium, e.g., cassette tape 50, which is loaded on the auto-changer 200. The auto-changer 200 has multiple cassette tapes 50 having a total recording capacity of N hours which is longer than the recording capacity of M hours of the disk device 40 as shown in FIGS. 2A and 2B.

With each cassette tape 50 having a recording capacity of n hours, the auto-changer 200 has a total recording capacity of $N=\Sigma n(N \geq M)$. The auto-changer 200 has the assignment of a backup area A with the same recording capacity M as the disk device 40. The backup area A is used to record the same AV information D0 recorded on the disk device 40 simultaneously or on expiration of a certain time irrespective of the frequency of access to the records.

In the auto-changer 200, the remaining recording capacity of N−M hours (L hours) is assigned to a record preserve area B. The record preserve area B is used as a virtual recording area when the server 100 is short of recording capacity, or used for preserving the AV information D0 of broadcast programs which have been broadcast in the past. The greater the value of L, the more is the virtual recording area usable for the server 100. The AV information D0 is transacted automatically between the server 100 and auto-changer 200, so that the operator can run the server 100 without being conscious of as to which of the server 100 and auto-changer 200 is the AV information D0 resident.

The LAN bus 60 is further connected with a control system 300, which monitors continuously the records on the disk device 40 and, upon detecting a missing record portion on the disk device 40, controls to restore the record by using the same record read out of the cassette tape 50.

A missing record portion on the disk device 40 is attributable to a momemtary read error caused by dusts or a permanent read error caused by a physical damage on the disk surface. The control system 300 sets an error flag upon detecting a missing record portion, and following the readout of all records of AV information D0, it reads out the AV information of the defective area posted with the error flag from the auto-changer 200 and records the information onto the disk device 40.

In case the defective area causes a permanent read error and cannot record the AV information D0 correctly, the control system 300 moves the logical address of the defective area to the spare recording area of the disk device 40 and records the AV information D0 from the auto-changer 200 into the spare recording area, thereby restoring the record.

Next, the backup saving operation for the AV information D0 implemented by the apparatus based on this embodiment will be explained. In the case of simultaneous backup saving of the AV information D0 received by the server 100 onto the auto-changer 200 (i.e., simultaneous filing process), the control system 300 directs both the server 100 and auto-changer 200 to prepare for the recording of the AV information D0. On completion of preparation for recording of both devices 100 and 200, the control system 300 determines the recording and/or reproducing start timing, and indicates the start signal to the server 100 and auto-changer 200.

On receiving the start signal, the server 100 introduces the AV information D0 from outside and records it onto the disk device 40, and at the same time, the auto-changer 200 receives the AV information D0 through the on-line 70 and records it onto the cassette tape 50.

Consequently, the same record recorded on the disk device 40 is saved as a backup record on the cassette tape 50 simultaneously.

In the case of backup saving of the AV information D0 from the server 100 to the auto-changer 200 on expiration of a certain time following the introduction (i.e., copy process), the control system 300 directs the server 100 to prepare for the reproduction of the AV information D0 and the auto-changer 200 to prepare for the recording of the AV information D0.

On completion of preparation for reproduction and recording of both devices 100 and 200, the control system 300 determines the recording and/or reproducing start timings, and indicates the start signals to the server 100 and auto-changer 200. On receiving the start signal, the server 100 reproduces the AV information D0 and sends it through the on-line 70 to the auto-changer 200, and at the same time, the auto-changer 200 receives and records the AV information D0 onto the cassette tape 50. Consequently, the record which has been recorded on the disk device 40 is saved as a backup record on the cassette tape 50 on expiration of a certain time following the introduction.

The control system 300 monitors continuously the records on the disk device 40. If a read error arises in a record portion 40A on the disk device 40 shown in FIG. 2A by some cause, resulting in a readout failure of all or part of the AV information D0, the same record portion 50A which has been saved in the backup area A of the auto-changer 200 in the above-mentioned record backup saving process is read out and recorded onto the disk device 40 automatically (i.e., restoring process).

As shown in FIG. 2, according to a process as aforementioned backup operation, the data recorded in the recording area 40B of the disk device 40 is also recorded in the recording area 50B of the auto-changer 200, so that such restoring process is possible. The recording area 50B of the auto-changer 200 excluding the backup area A can be used as a record preserve area B (namely, imaginary recording area).

Consequently, the disk device 40 has its record before the occurrence of failure restored. The read-error record portion 40A can be recovered without the need of disk replacement in a shorter time as compared with the recording and/or reproducing apparatus equipped with only the disk device 40. The apparatus can have enhanced reliability in maintaining the AV information D0 including audio and/or video signals and computer-based graphic information.

Based on the combinational use of the disk device 40 and multiple cassette tapes 50, the hybrid recording and/or reproducing apparatus of this embodiment is capable of filling the shortage of recording capacity of the disk device 40 with the cassette tapes 50. Accordingly, the server 100 can have its practical recording capacity expanded and its storage cost per unit recording capacity reduced.

Preferred Embodiment

Figure 3:
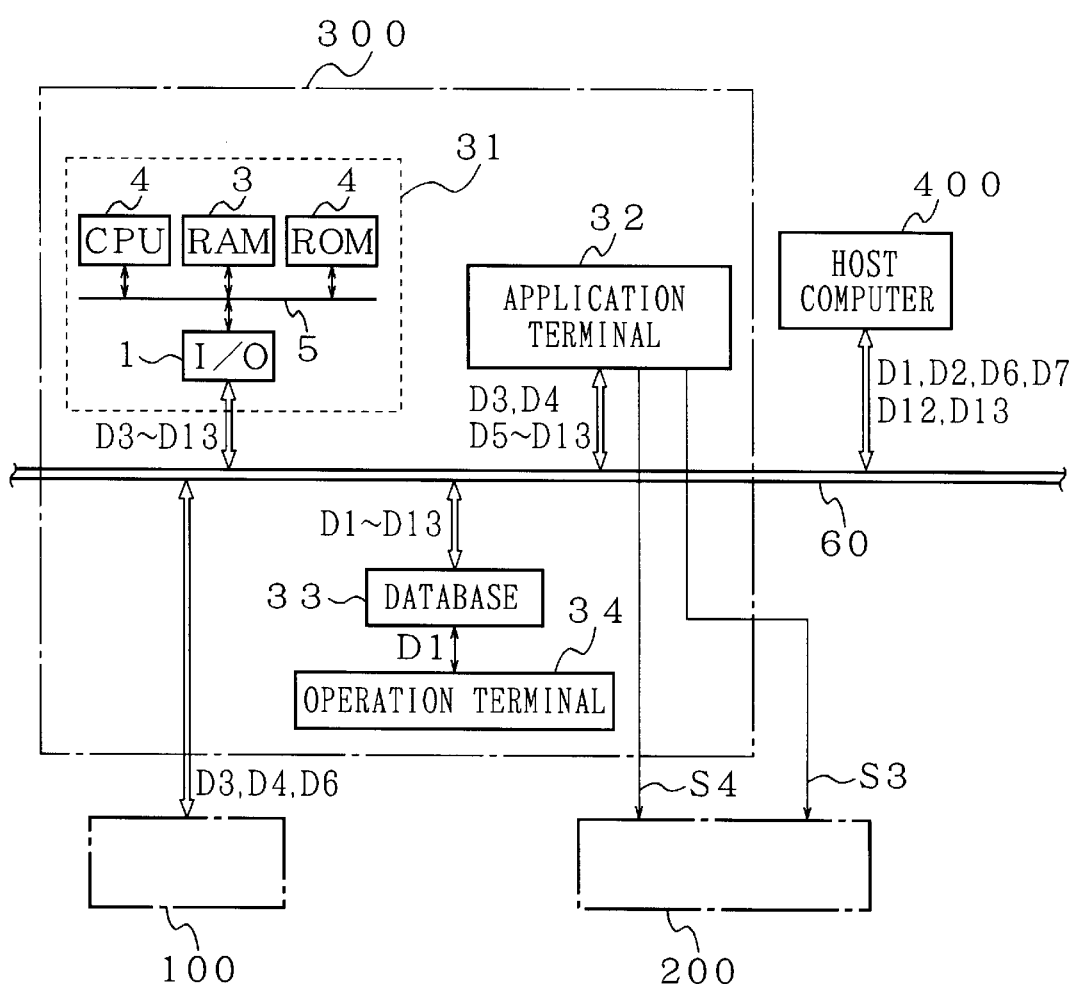
FIG. 3 is a block diagram showing the arrangement of the control system 300 based on an embodiment of this invention.

FIG. 3 shows the arrangement of the control system 300 based on an embodiment of this invention. The control system 300, which monitors the operational state of the overall system and sends command signals and data to the server 100 and auto-changer 200, includes application terminals 31 and 32, a database 33, and an operation terminal 34.

The application terminal 31 consists of an I/O interface 1, a ROM 2, a RAM 3, and a CPU (central processing unit) 4, which are connected with each other by an internal bus 5. The ROM 2 stores a control program for controlling the apparatus. Another application terminal 32 has the similar arrangement, although it is not shown in detail.

The database 33 stores attribute information for the AV information D0 recorded on the disk device 40 and cassette tapes 50, and the application terminals 31 and 32 control the attribute information. The attribute information includes the source record ID (identification number) such as AV information at the production of program, record length, title, source record driver ID such as disk driver 13, record position, audio mode (AM, FM, stereo), video mode (NTSC, PAL, EDTV), SOM trim value indicating the value of head position adjustment, source record flag indicating the recording state of AV information, file name, and information about the order of reproduction.

The following Table 1 lists 10 items, for example, among the attribute information of AV information controlled by the database 33.

TABLE 1

| Item | Description |
| --- | --- |
| Source record ID | key code used to search a source record |
| Record length | e.g., 15 seconds, 10 minutes |
| Title | Title of source record, e.g., "Summer in Karuizawa" |
| Source record driver ID | Reproduction device used for the source record, e.g., V: VTR |
| Record position | Information on the record position of source record, or file name, e.g., position information: time code: (00:10:15:00) file name: (K7001637) |
| Audio mode | e.g., monaural, stereo, bilingual |
| Video mode | e.g., NTSC, EDTV-2, PAL |
| SOM trim value | Offset value indicating the reproduction start point of AV signal (in frame unit), e.g., −5, +10 |
| Source record flag | State of recording and residence of record (server/auto-changer) |
| Order of reproduction | Order of selection and reproduction of cassette tapes 50 |

The following Table 2 shows the management of the recording state of the AV information D0 by the database 33.

TABLE 2

| Source record ID | Recording | Resident in server | Resident in auto-changer | Remarks |
| --- | --- | --- | --- | --- |
| A0001 | Not recorded | x | x | Not recorded |
| A0002 | Recorded | o | x | Recorded in server; copied to auto-changer later |

TABLE 2-continued

| Source record ID | Recording | Resident in server | Resident in auto-changer | Remarks |
|---|---|---|---|---|
| A0003 | Recorded | o | o | Copied in auto-changer |
| A0004 | Recorded | x | o | Erased from server to free recording area | o: resident
x: absent

As shown in Table 2, one source record (AV information D0) takes one of four record states: (1) it is absent in both the server 100 and auto-changer 200, (2) it is resident in the server 100 but is absent in the auto-changer 200 (the source record is treated as being already recorded), (3) it is resident in both the server 100 and auto-changer 200 (the source record is treated as being already recorded), and (4) it is absent in the server 100 but is resident in the auto-changer 200 (the source record is treated as being already recorded). The four record states signify that the source record has yet recorded, it has been recorded in the server and will be copied into the auto-changer later, it has been copied into the auto-changer, and it has been erased from the server for reserving a vacant area.

The database 33 has the associated operation terminal 34 as shown in FIG. 3, and the attribute information of the records in the database 33 are displayed on its display screen (not shown). The operation terminal 34 further includes a keyboard and mouse device, allowing the operator to enter instructions of reproduction D6 (will be called "play list information" hereinafter) by using these input devices.

Figure 4:
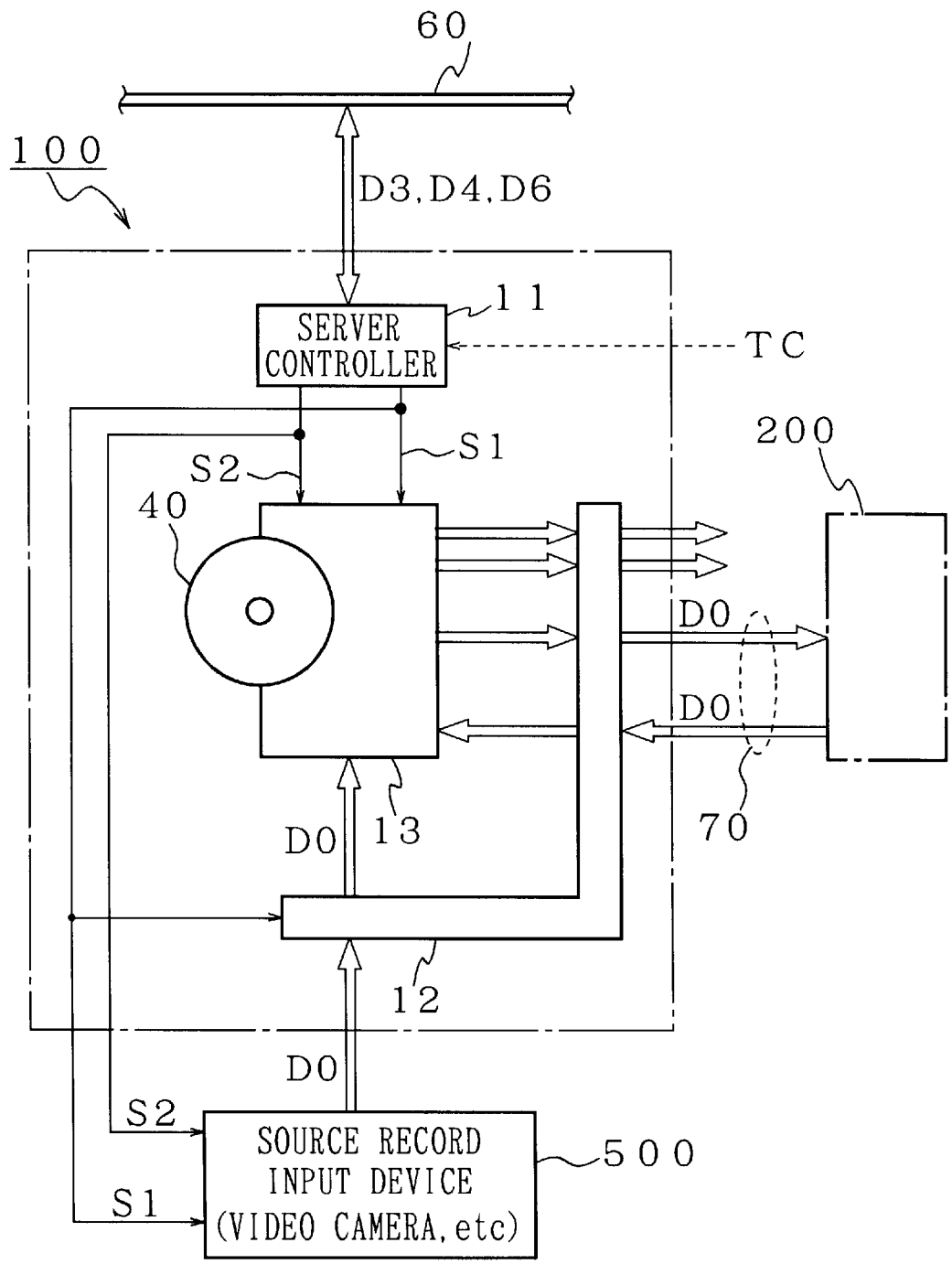
FIG. 4 is a block diagram showing the arrangement of the server 100 based on an embodiment of this invention.

The server 100 has an associated server controller 11 as shown in FIG. 4, which produces the recording and/or reproducing control signal S1 and recording and/or reproducing start signal S2 by decoding the miss-file ("not filed") information D3 and vacant area address information D4 entered through the application terminal 31. The server controller 11 has its output stage connected to a disk driver 13, which is prepared for recording and reproduction in accordance with the recording and/or reproducing control signal S1.

The disk driver 13 is connected with a switcher 12, which indicates the cross point that is the head position of the AV information D0 to be recorded onto the disk device 40 in accordance with the recording and/or reproducing control signal S1. The switcher 12 is connected at its input stage to a source record input device 500, such as a video camera, and to the auto-changer 200 for introducing the AV information D0 including images of program and commercial.

On completion of preparation for recording of the disk driver 13, the timing of reproduction by the source record input device 500 such as a video camera and the timing of recording by the server 100 are determined by the application terminal 31. Based on the determined timings, the AV information D0 from the source record input device 500 is recorded onto the disk device 40 in the disk driver 13 in response to the recording and/or reproducing start signal S2 (i.e., filing process).

The server 100 can transact information on multiple paths by means of the switcher 12 as shown in FIG. 4. The server 100 can also input and output information concurrently from/to the associated disk driver 13 by means of individual input and output processors (not shown) based on the allotment of time slots to the processors by the main controller provided in the disk driver 13. The time-sliced input/output processes implemented by the individual input and output processors seem to be simultaneous information input/output operations on a long time scale of the order of a second.

Figure 5:
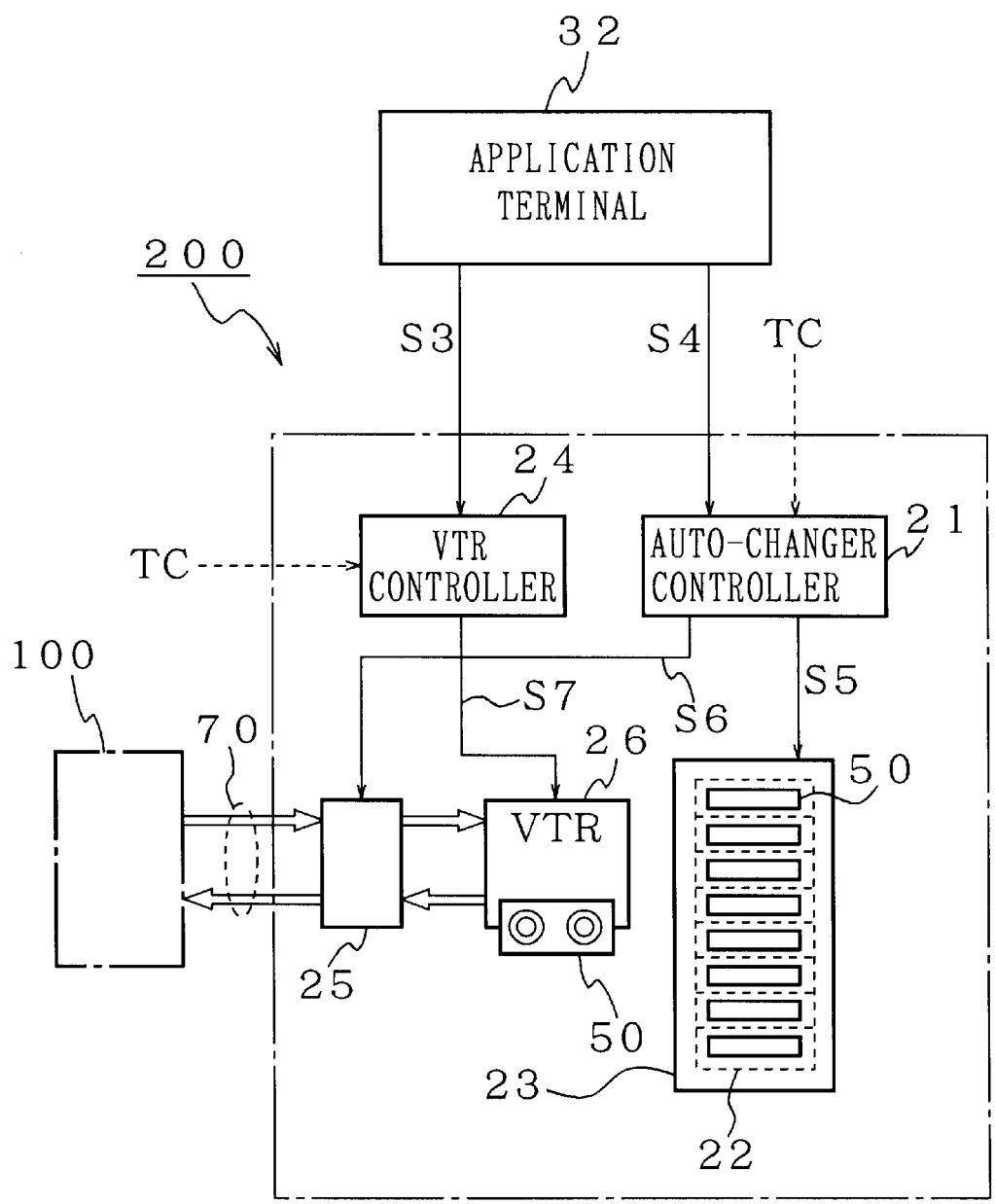
FIG. 5 is a block diagram showing the arrangement of the tape auto-changer 200 based on an embodiment of this invention.

The auto-changer 200 includes an auto-changer controller 21 as shown in FIG. 5, by which a tape carry control signal S5 for carrying the cassette tape 50 is produced based on the tape selection control signal S3 entered through the application terminal 32.

The auto-changer controller 21 is connected at its output stage to a recording medium carrier (will be termed simply "elevator" hereinafter) 23 having an associated medium rack 22. The cassette tape 50 specified by the application terminal 32 is selected from among the cassette tapes 50 stacked on the medium rack 22 in accordance with the tape carry control signal S5, and the selected cassette tape 50 is carried between the medium rack 22 and a video tape recorder (VTR) 26 which is located at the output stage of the elevator 23.

The auto-changer 200 further includes a recording and/or reproducing controller (will be termed "VTR controller" hereinafter) 24 as shown in FIG. 5. The VTR controller 24 produces a recording and/or reproducing control signal S7 for recording and/or reproducing a record to/from a cassette tape 50 loaded onto the VTR 26 from the recording and/or reproducing control signal S4 provided by the application terminal 32. The VTR 26 is activated in accordance with the tape recording and/or reproducing control signal S7 provided by the VTR controller 24, so that a record is recorded and/or reproduced on the cassette tape 50 which has been carried by the elevator 23.

The auto-changer controller 21 is further connected at its output stage to a switcher 25, which switches the operation mode for recording or reproducing the AV information D0. On completion of recording and/or reproducing preparation, the AV information D0 is recorded or reproduced on a cassette tape 50 selected from among those in the medium rack 22.

Figure 6:
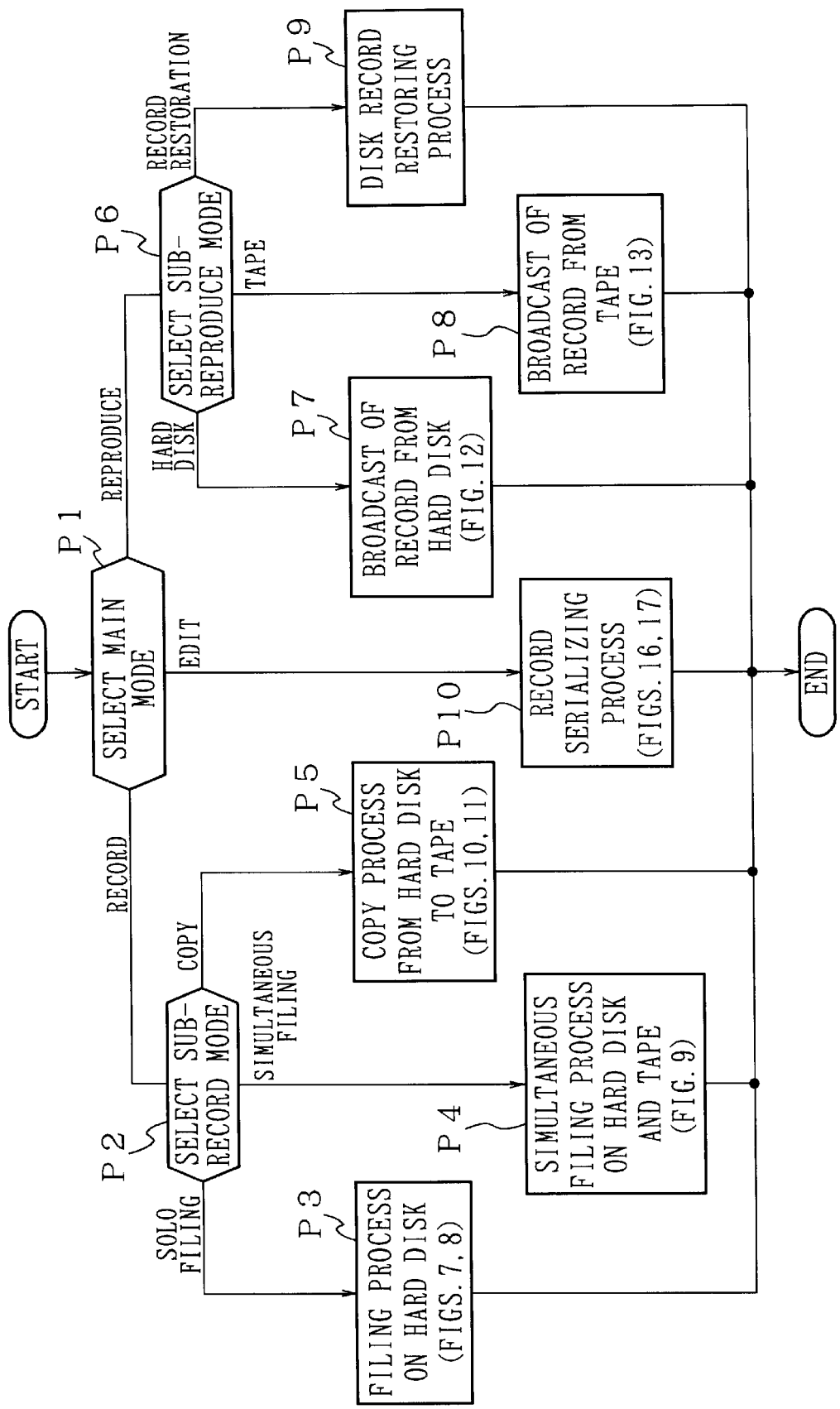
FIG. 6 is a flowchart used to explain the major functions of the hybrid recording and/or reproducing apparatus.

Next, the operation of the recording and/or reproducing system based on this embodiment will be explained. FIG. 6 shows by flowchart of the overall operation of this recording and/or reproducing system.

The recording and/or reproducing system performs three major functions that are intended for the smooth operation of broadcasting stations and the like. These functions are recording mode for recording the AV information D0 produced by a source record input device 500 such as a video camera, reproduction mode for reproducing the AV information D0 at the time of broadcasting, and edit mode for serializing on cassette tapes 50 the AV information D0 including multiple commercial images in the order of reproduction at the time of broadcasting. Mode selection is based on the start command issued by a host computer 400 or the operator.

In step P1 on the flowchart of FIG. 6, the application terminal 31 receives a start command from the host computer 400 or the operator, and selects one of recording mode, reproduction mode and edit mode: (main mode selection).

In case recording mode is selected by the host computer 400, the sequence proceeds to step P2 to select a subordinate recording mode. Subordinate recording modes include solo recording mode for recording the AV information D0 into the server 100, simultaneous recording mode for recording the AV information D0 into the server 100 and auto-changer

200 simultaneously, and copy mode for copying the AV information D0 from the server 100 to the auto-changer 200.

When solo recording mode is selected, the sequence proceeds to step P3 to file the AV information D0 into the disk device 40 in the server 100. This filing process will be explained in detail later on the flowchart of FIGS. 7 and 8.

When simultaneous recording mode is selected, the sequence proceeds to step P4 to file the AV information D0 into the disk device 40 in the server 100 and the cassette tape 50 in the auto-changer 200 simultaneously. This simultaneous filing process will be explained later on the flowchart of FIG. 9. In this embodiment using one VTR 26, records as much as the recording capacity n of one cassette tape 50 can be recorded simultaneously.

If the quantity of recording exceeds the tape capacity, the subordinate recording mode will be switched to solo recording mode (filing process) when the recording capacity of the cassette tape 50 is used up, and the rest of the AV information D0 will be copied from the server 100 to the auto-changer 200 based on the copy process on expiration of a certain time.

When copy mode is selected, the sequence proceeds to step P5 to extract and copy the AV information D0, which is absent on the cassette tape 50, from the disk device 40 in the server 100 to the cassette tape 50 in the auto-changer 200. This copy process will be explained in detail later on the flowchart of FIGS. 10 and 11.

In case, at step P1, reproduction mode is selected by the application terminal 31 in response to the start command from the host computer 400 or the operator, the sequence proceeds to step P6 to select a subordinate reproduction mode. Subordinate reproduction modes include disk reproduction mode for reproducing the AV information D0 from the server 100 at broadcasting, tape reproduction mode for reproducing the AV information D0 from the auto-changer 200 for the revival broadcast, and restoration mode for recovering the missing record portion of the AV information D0 in the server 100.

When disk reproduction mode is selected, the sequence proceeds to step P7 to reproduce the AV information D0 from the disk device 40 in the server 100. This reproduction process will be explained in detail later on the flowchart of FIG. 12. When tape reproduction mode is selected, the sequence proceeds to step P8 to reproduce the AV information D0 from the cassette tape 50 in the auto-changer 200. This reproduction process will be explained later on the flowchart of FIG. 13.

When restoration mode is selected, the sequence proceeds to step P9 to record the AV information D0 from the cassette tape 50 in the auto-changer 200 for the missing record portion into the disk device 40 in the server 100. This restoring process will be explained in detail later on the flowcharts of FIGS. 14 and 15.

In case, at step P1, edit mode is selected by the application terminal 31 in response to the start command from the host computer 400 or the operator, the sequence proceeds to step P10 to serialize on a cassette tape(s) 50 the AV information D0 including multiple commercial images in the order of reproduction at the time of broadcasting. This record serializing process will be explained in detail later on the flowchart of FIGS. 16 and 17. Next, the above-mentioned seven functions will be explained in detail.

(1) Filing of AV Information (Solo Recording Mode)

The AV information filing process will be explained in connection with step P3 in FIG. 6 and with reference to the flowchart of FIG. 7 and FIG. 8. When the filing process is designated for filing the introduced AV information D0 including images of program and commercial into the server 100, the first step A1 on the flowchart of FIG. 7 waits for the transfer of filing information D1 from the host computer 400 or the operator.

The filing information D1 transferred from the host computer 400 or issued by the operator on the operation terminal 34 is registered in the database 33 as shown in FIG. 3.

In order for the AV information D0 including images of program and commercial from the source record input device 500, such as a video camera, to be recorded onto the disk device 40, a vacant area is needed. Therefore, in step A01 on the flowchart of FIG. 8, the application terminal 31 checks as to whether a vacant area of at least a prescribed size is available on the disk device 40.

If the vacant area is smaller than the prescribed size, the sequence proceeds to step A02 to free a recording area, or otherwise the sequence proceeds immediately to the recording process in the existing vacant area.

In the case of the absence of a sufficient vacant area, the step A02 sets the condition of erasion of records on the disk device 40. The condition of selection of records to be erased can be set arbitrarily depending on the operation rule. For example, the oldest record on the disk device 40 is selected for erasion, or records without the play list information D6 for the instruction of reproduction and without the schedule of use (broadcast) are selected for erasion.

By displacing the infrequently-accessed AV information D0 into the record preserve area B of the auto-changer 200, it becomes possible to have a disk device 40 with only capacity that matches with the operating cost and a large number of inexpensive cassette tapes 50 which share most recording capacity.

After the condition of erasion has been set in step A02, the same AV information D0 as the one recorded in the backup area A is erased from the disk device 40 and, at the same time, the AV information D0 in the backup area A is saved for preservation in the record preserve area B of the cassette tape 50 in step A03. Then, the rest of the introduced AV information D0 is recorded in the vacant area of the disk device 40 resulting from the record saving and erasing processes and, at the same time, the same AV information D0 is saved for the backup purpose in the auto-changer 200.

Records are erased from the disk device 40 until the size of freed area exceeds the prescribed size. The application terminal 31 checks as to whether a recording area of the prescribed size has been freed in step A04. If a sufficient vacant area is confirmed, the sequence proceeds to step A05 to revise the attribute information, or otherwise returns to step A03 to continue the record erasing process.

Since the contents of the disk device 40 have varied by the record saving/erasing process, the application terminal 31 revises the attribute information in the database 33 in step A05. Specifically, the columns "resident in server" and "resident in auto-changer", i.e., the record flag D5, shown in Table 2 are corrected. A vacant area is now reserved on the disk device 40, and the sequence proceeds to the recording operation for the AV information D0.

The filing information D1 is read out of the database 33 and held temporarily in the work memory (RAM) 3 by way of the I/O interface 1 of the application terminal 31, as shown in FIG. 3. The filing information D1 is transferred from the RAM 3 to the CPU 4, by which a control program is read out of the ROM 2 in accordance with the information D1.

Figure 7:
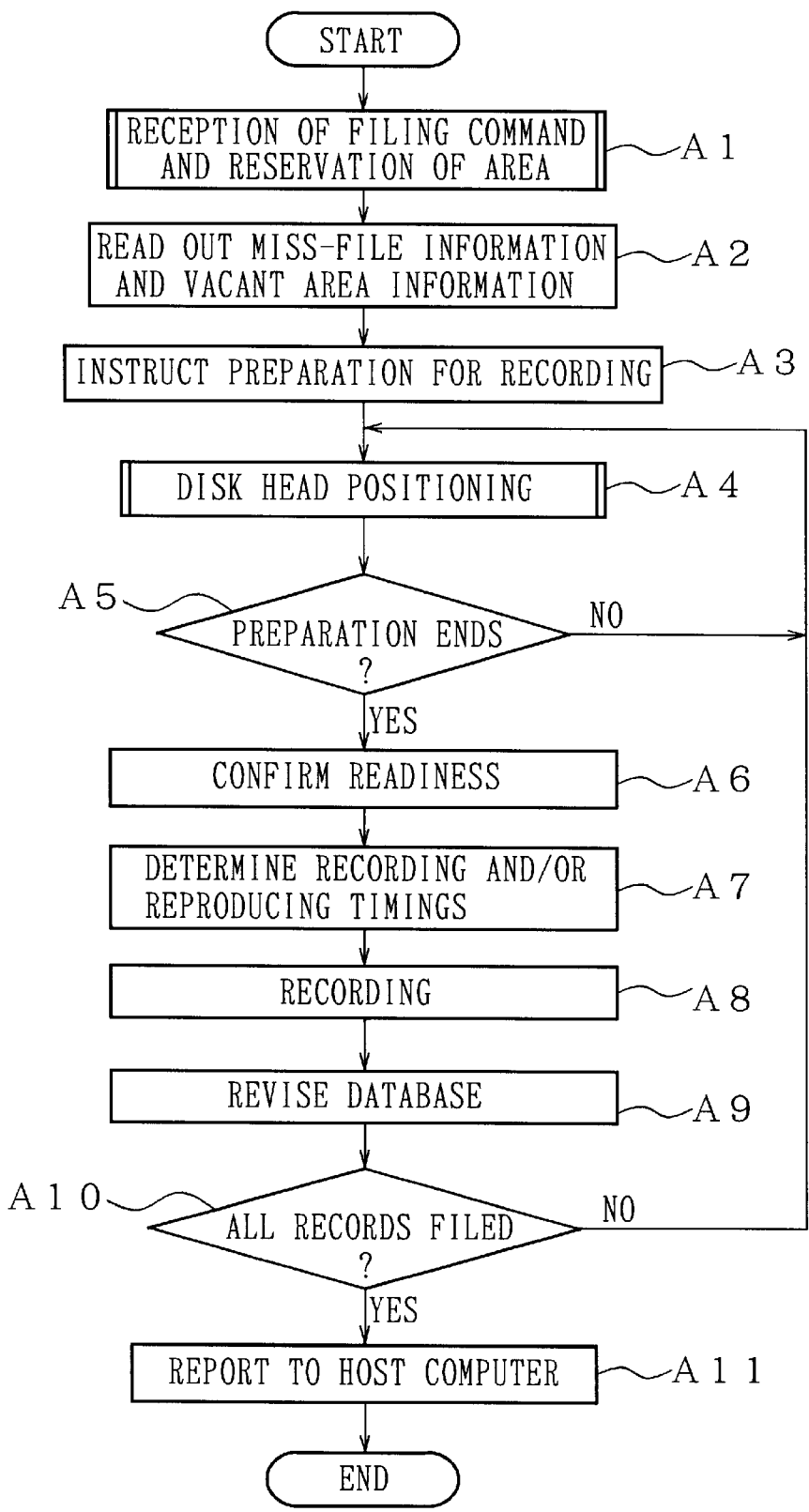
FIG. 7 is a flowchart used to explain the filing process for the AV information.
Figure 8:
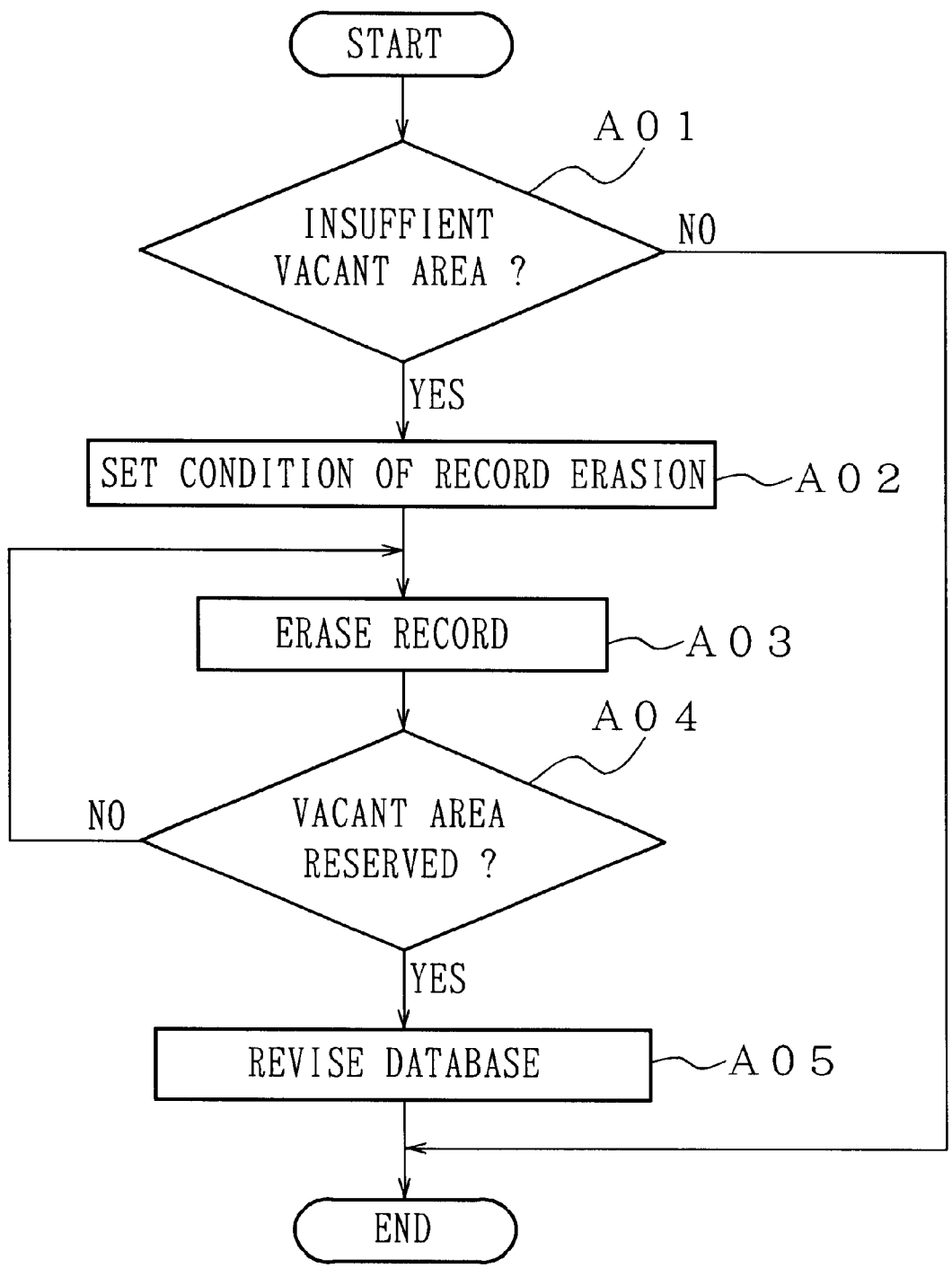
FIG. 8 is a flowchart of the reservation of a vacant area on the hard disk.

The control program operates on the database 33 to read out the miss-file information D3 and vacant area address information D4 to the application terminal 31 as shown in step A2 on the flowchart of FIG. 7. The miss-file information D3 indicates that the AV information D0 is not yet filed (recorded), and the vacant area address information D4 specifies a storage location for the AV information D0. The application terminal 31 which has received the information D3 and D4 directs the server 100 in step A3 to prepare for recording.

The server 100 prepares for recording the AV information D0 based on the received miss-file information D3 and vacant area address information D4 in step A4. Specifically, for example, the server controller 11 which has decoded the miss-file information D3 and vacant area address information D4 issues the recording and/or reproducing control signal S1 for the preparation of recording and reproduction to the switcher 12 and disk driver 13.

The server controller 11 sends the recording and/or reproducing start signal S2 to the disk driver 13 on completion of preparation for recording.

The recording and/or reproducing control signal S1 given to the switcher 12 indicates the cross point that is the head position of the AV information D0 to be recorded on the disk device 40. The preparation of recording finishes when the recording head of the disk driver 13 is moved to the cross point.

After the preparation for recording of the server 100 finishes in step A5 and the application terminal 31 acknowledges the readiness in step A6, the timing of reproduction by the source record input device 500 such as a video camera and the timing of recording by the server 100 are determined. The result of timing determination are indicated to the server controller 11 and source record input device 500 in step A7.

The server controller 11 which has received the timing signal makes reference to the time code TC given from outside and gives the recording and/or reproducing start signal S2 to the disk driver 13 and source record input device 500. Consequently, the AV information D0 from the source record input device 500 is recorded onto the disk device 40 in the disk driver 13 in response to the same recording and/or reproducing start signal S2 in step A8: (filing process).

At each recording of the AV information D0, which is a source record for a broadcast program or the like, the application terminal 31 revises the contents of database 33 in step A9. The application terminal 31 determines the completion of recording of all records. If recording is not yet finished, the sequence proceeds to step A4 to continue the filing process.

On completion of recording, the sequence proceeds to the last step A11, in which the application terminal 31 sends the filing result information D2 indicative of the end of recording to the host computer 400.

In this manner, the AV information D0 including images of program and commercial from the source record input device 500, such as a video camera, is recorded onto the disk device 40 in the server 100: (filing process).

(2) Simultaneous Filing of AV Information (Simultaneous Recording Mode)

The AV information simultaneous filing process will be explained in connection with step P4 in FIG. 6 and with reference to the flowchart of FIG. 9. The recording and/or reproducing system is capable of filing the AV information D0 including images of program and commercial into the server 100 and auto-changer 200 simultaneously. In this operation mode, the first step B1 on the flowchart of FIG. 9 waits for the transfer from the host computer 400 or the operator of the filing information D1 indicative of simultaneous filing.

The filing information D1 transferred from the host computer 400, for example, to the application terminal 31 is registered in the database 33. A vacant area is checked and reserved on the disk device 40 as shown in FIG. 8, and vacant area reservation on the cassette tape 50 takes place with reference to the database 33.

Following the reservation of vacant areas on both storage devices, the control program which has been loaded in accordance with the filing information D1 operates on the database 33 in step B2 to send the miss-file information D3 and vacant area address information D4 to the application terminal 31, and at the same time send the information D3 and D4 and copy command information D7, indicative of the command of copy (by recording) of the AV information D0, to the application terminal 32.

Receiving the miss-file information D3 and vacant area address information D4 in step B3, the application terminal 31 directs the server 100 to prepare for recording and the application terminal 32 directs the auto-changer 200 to prepare for recording.

The server 100 prepares for the recording of AV information D0 based on the received information D3 and D4 in step B4. The preparation of recording by the server 100 is identical to the head positioning on the disk device 40 which is carried out in step A4 in FIG. 7, and the explanation thereof is omitted.

Receiving the miss-file information D3, vacant area address information D4 and copy command information D7, the application terminal 32 reads out an auto-changer control program from the ROM, although it is not shown in the figures. This control program generates a tape selection control signal S3 for selecting a cassette tape 50 and a tape recording and/or reproducing control signal S4. These signals S3 and S4 are given to the auto-changer controller 21 and VTR controller 24, respectively.

The auto-changer controller 21 controls the elevator 23 and switcher 25 based on the received tape selection control signal S3. Specifically, the auto-changer controller 21 produces a tape carry control signal S5 from the tape selection control signal S3 and gives it to the elevator 23. The elevator 23 takes out the cassette tape 50 specified by the application terminal 32 from among the cassette tapes stacked on the medium rack 22, and carries it to the VTR 26.

The VTR controller 24 activates the VTR 26 based on the received recording and/or reproducing control signal S4 so that the cassette tape 50 carried by the elevator 23 is loaded onto the VTR 26. The recording and/or reproducing start signal S7 is sent from the VTR controller 24 to the VTR 26 on completion of preparation for recording.

During the tape loading operation, the auto-changer controller 21 issues a recording and/or reproducing mode switch control signal S6 to the switcher 25. The switcher 25 switches the operation mode in accordance with the received mode switch control signal S6 so that the AV information D0 is recorded. The preparation of recording for the VTR 26 finishes at this mode switching.

The preparation for recording finishes on both parts of the server 100 and auto-changer 200 in steps B5 and B7, respectively, and after the application terminal 31 acknowledges the readiness in step B8, the timing of reproduction by the source record input device 500 and the timing of recording by the server 100 are determined. The result of timing determination are indicated to the source record input device 500, server controller 11 and application terminal 32, and also indicated to the VTR controller 24 by way of the application terminal 32 in step B9.

The server controller 11 which has received the timing signal makes reference to the time code TC given from outside and sends the recording and/or reproducing start signal S2 to the disk driver 13 and source record input device 500. Similarly, the VTR controller 24 which has received the timing signal from the application terminal 32 makes reference to the time code TC and sends the recording and/or reproducing start signal S7 to the VTR 26.

Consequently, in step B10, the AV information D0 from the source record input device 500 is recorded onto the disk device 40 in the disk driver 13 in response to the recording and/or reproducing start signal S2 and, at the same time, in response to the recording and/or reproducing start signal S7 of the same timing, the same AV information D0 is recorded for the backup purpose onto the cassette tape 50 on the VTR 26 through the on-line 70.

Based on the determination of the timing of reproduction from the source record input device 500 and the timing of recording onto the server 100 with reference to the external time code TC which is common to both devices, it becomes possible to synchronize the recording on the disk device 40 and cassette tape 50, allowing the server 100 and auto-changer 200 to perform the simultaneous recording of the AV information D0 accurately.

At each recording of the AV information D0 for a broadcast program or the like, the application terminal 31 revises the contents of database 33 in step B11. The application terminal 31 determines the completion of recording of all records in step B12. If recording is not yet finished, the sequence returns to steps B4 and B7 to continue the simultaneous filing process.

On completion of recording, the sequence proceeds to step B13, in which the cassette tape 50 is ejected (unloaded) from the VTR 26 in the auto-changer 200 and it is carried by the elevator 23 and stacked back on the medium rack 22.

In the last step B14, the application terminal 31 sends the filing result information D2 indicative of the end of recording to the host computer 400.

In this manner, the AV information D0 including images of program and commercial from the source record input device 500, such as a video camera, is recorded simultaneously onto the disk device 40 in the server 100 and the cassette tape 50 in the auto-changer 200. The recording and/or reproducing system is capable of recording simultaneously the AV information D0 as much as the recording capacity n of one cassette tape 50 irrespective of the frequency of access to the records.

(3) Copy of AV Information (Copy Mode)

Figure 10:
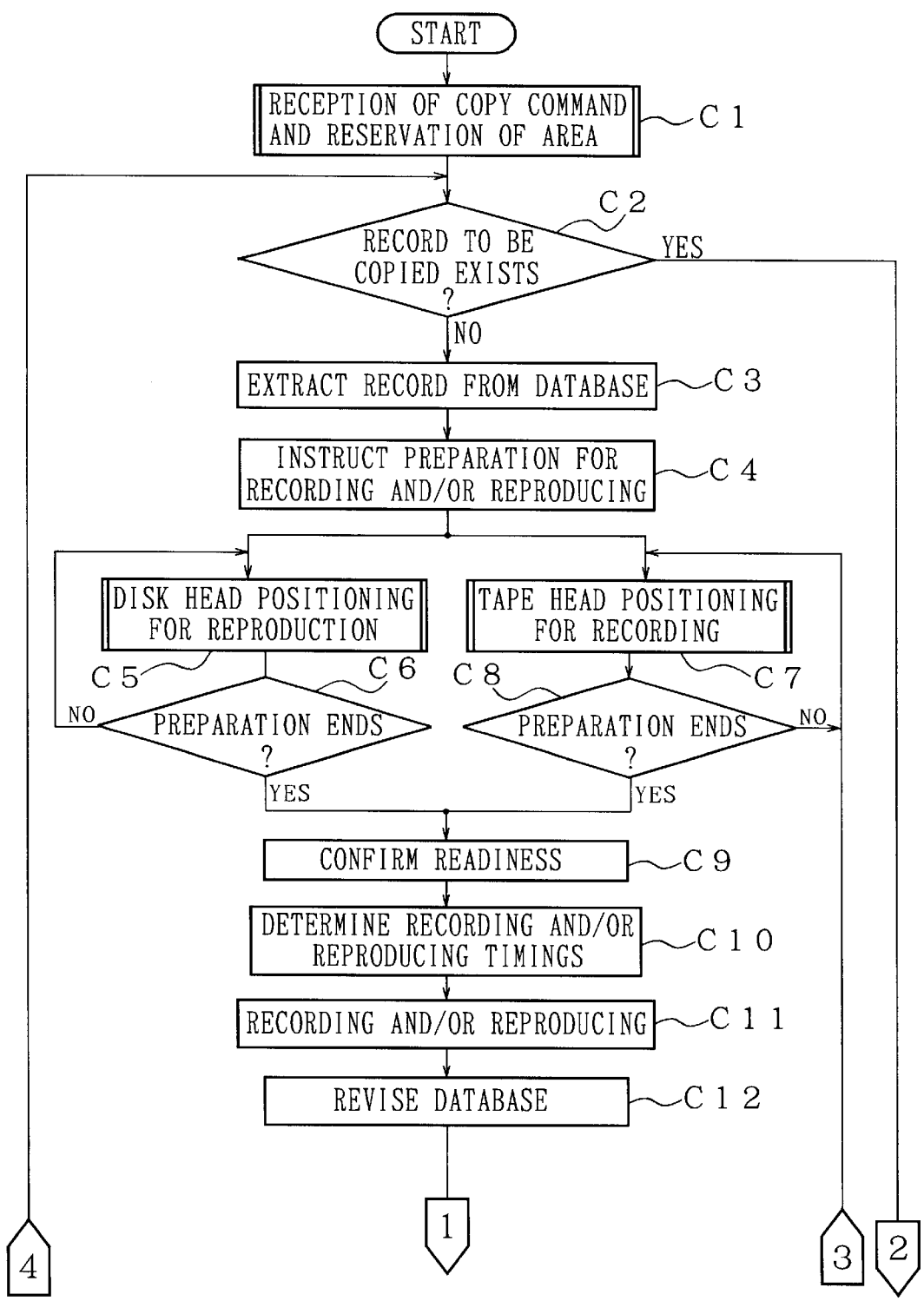
FIG. 10 is a flowchart (part 1) of the copy process for the AV information.
Figure 11:
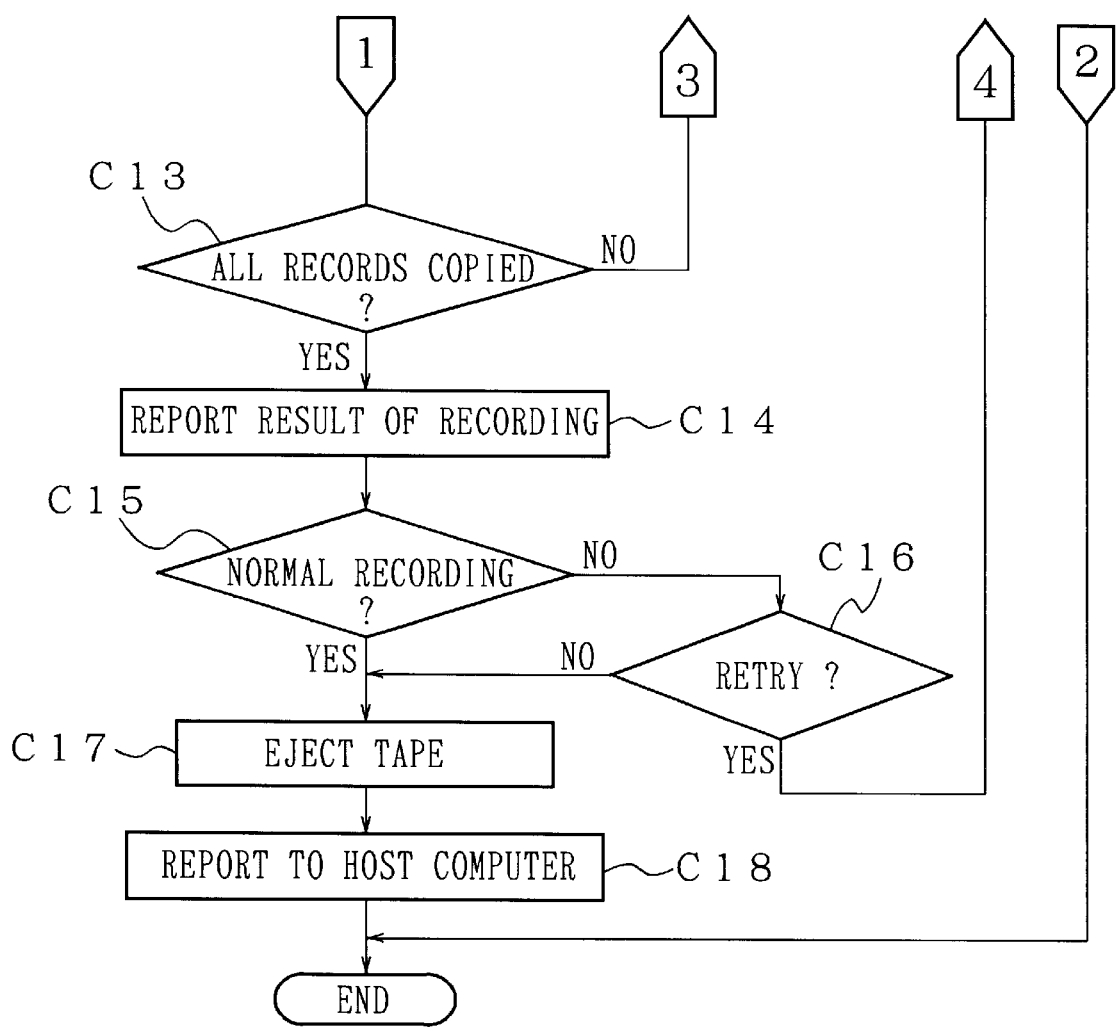
FIG. 11 is a flowchart (part 2) of the copy process for the AV information.

The AV information copy process will be explained in connection with step P5 in FIG. 6 and with reference to the flowchart of FIG. 10 and FIG. 11. The recording and/or reproducing system is capable of saving the AV information D0, which could not been treated by simultaneous filing, into the auto-changer 200 for the backup purpose on expiration of a certain time following the filing process. In this operation mode of copying the AV information D0, which has been recorded in the server 100, into the auto-changer 200, the first step C1 on the flowchart of FIG. 10 waits for the transfer of copy command information D7 from the host computer 400 or the operator.

The copy command information D7 transferred from the host computer 400, for example, to the application terminal 31 is registered in the database 33. At the same time, the database 33 is referenced in order to reserve a vacant area on the cassette tape 50. Following the reservation of a vacant area on the cassette tape 50, the sequence proceeds to the copy operation.

The application terminal 31 checks in step C2 the existence of information to be copied, i.e., AV information D0 that is already recorded on the disk device 40 but is not recorded on the cassette tape 50, by checking the record flag D5 in the database 33. If a record to be copied is resident on the disk device 40, the sequence proceeds to step C3, or otherwise the copy process is aborted.

In case the record to be copied exists, the application terminal 31 extracts it from the database 33 in step C3. Subsequently, the application terminal 31 sends the copy command information D7 to the server 100 and application terminal 32 in step C4, thereby directing the server 100 to prepare for reproduction and the auto-changer 200 to prepare for recording.

In step C5, the server 100 carries out the head position. Specifically, the server controller 11 which has received the copy command information D7 controls the switcher 12 and disk driver 13 (refer to disk head positioning of step B4 in FIG. 9 implemented in the foregoing filing process). Consequently, the reproduction head of the disk driver 13 is moved to the cross point, and the preparation for reproduction of the server 100 finishes.

Figure 9:
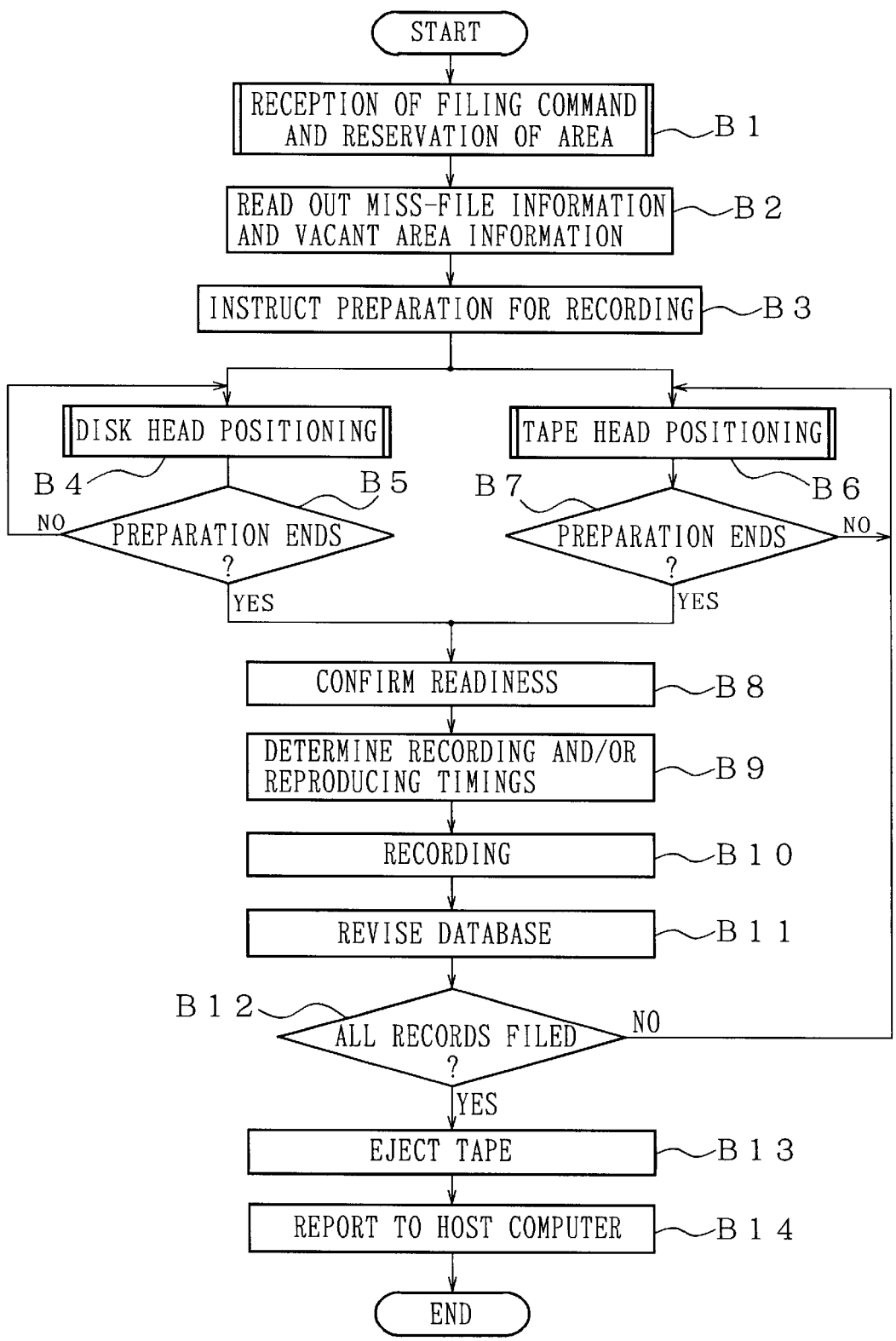
FIG. 9 is a flowchart of the simultaneous filing process for the AV information.

In parallel to this operation, the application terminal 32 which has received the copy command information D7 reads out a control program from the ROM in step C7, by which the auto-changer controller 21 and VTR controller 24 are controlled (refer to tape head positioning of step B6 in FIG. 9). Consequently, a cassette tape 50 is loaded onto the VTR 26, the operation mode is switched from recording mode to reproduction mode by the switcher 25, and the preparation for recording of the auto-changer 200 finishes.

After the preparation for reproduction of the server 100 and the preparation for recording of the auto-changer 200 finish in step C6 and step C8, respectively, and the application terminal 31 acknowledges their readiness of recording and/or reproducing in step C9, the timings of recording and reproduction of both devices are determined. The result of timing determination is indicated by the application terminal 31 to the server controller 11 and application terminal 32 in step C10.

The server controller 11 which has received the timing signal makes reference to the time code TC and sends the recording and/or reproducing start signal S2 to the disk driver 13 in the same manner as the filing process explained previously. In the auto-changer 200 which has received the timing signal from the application terminal 32, the VTR controller 24 makes reference to the time code TC and sends the recording and/or reproducing start signal S7 to the VTR 26, as has been explained in connection with step B9 in FIG. 9.

The AV information D0 reproduced from the disk device 40 in the server 100 in step C11 in response to the recording and/or reproducing start signal S2 of the common timing is fed into the auto-changer 200 through the on-line 70 and recorded onto the cassette tape 50 in response to the recording and/or reproducing start signal S7.

At each recording of the AV information D0 for a broadcast program or the like, the application terminal 31 revises the contents of database 33 in step C12. The application terminal 31 determines the completion of recording of all records in step C13 on the flowchart of FIG. 11. If recording is not yet finished, the sequence returns to steps C5 and C7 to continue the copying process.

On completion of recording, the sequence proceeds to step C14, in which the application terminal 32 sends the copy result information D8 to the application terminal 31.

The application terminal 31 which has received the copy result information D8 checks the result of copy process in step C15. When the copy process result is determined to be normal, the sequence proceeds to step C17, in which the cassette tape 50 is ejected from the VTR 26 (for the tape ejecting operation, refer to step B13 in FIG. 9).

In the last step C18, the application terminal 31 sends the filing result information D2 indicative of the end of recording to the host computer 400.

In case the result of copy process is determined to be abnormal, the sequence branches to step C16, in which the copied record is invalidated and the application terminal 31 waits for a command as to whether copy is retried immediately or carried out later. In response to the command of immediate recurrent copy process, the sequence returns to step C2 to carry out the copy process again. In response to the command of later copy process, the sequence proceeds to step C17, in which the cassette tape 50 is ejected, and application terminal 31 sends the filing result information D2 indicative of the unsuccessful recording to the host computer 400.

In this manner, for the AV information D0 that could not be saved on the cassette tape 50 by the simultaneous filing process, the records on the disk device 40 are copied for the backup purpose onto the cassette tape 50 on expiration of a certain time following the filing.

(4) Reproduction of AV Information in Server (Disk Reproduction Mode)

Figure 12:
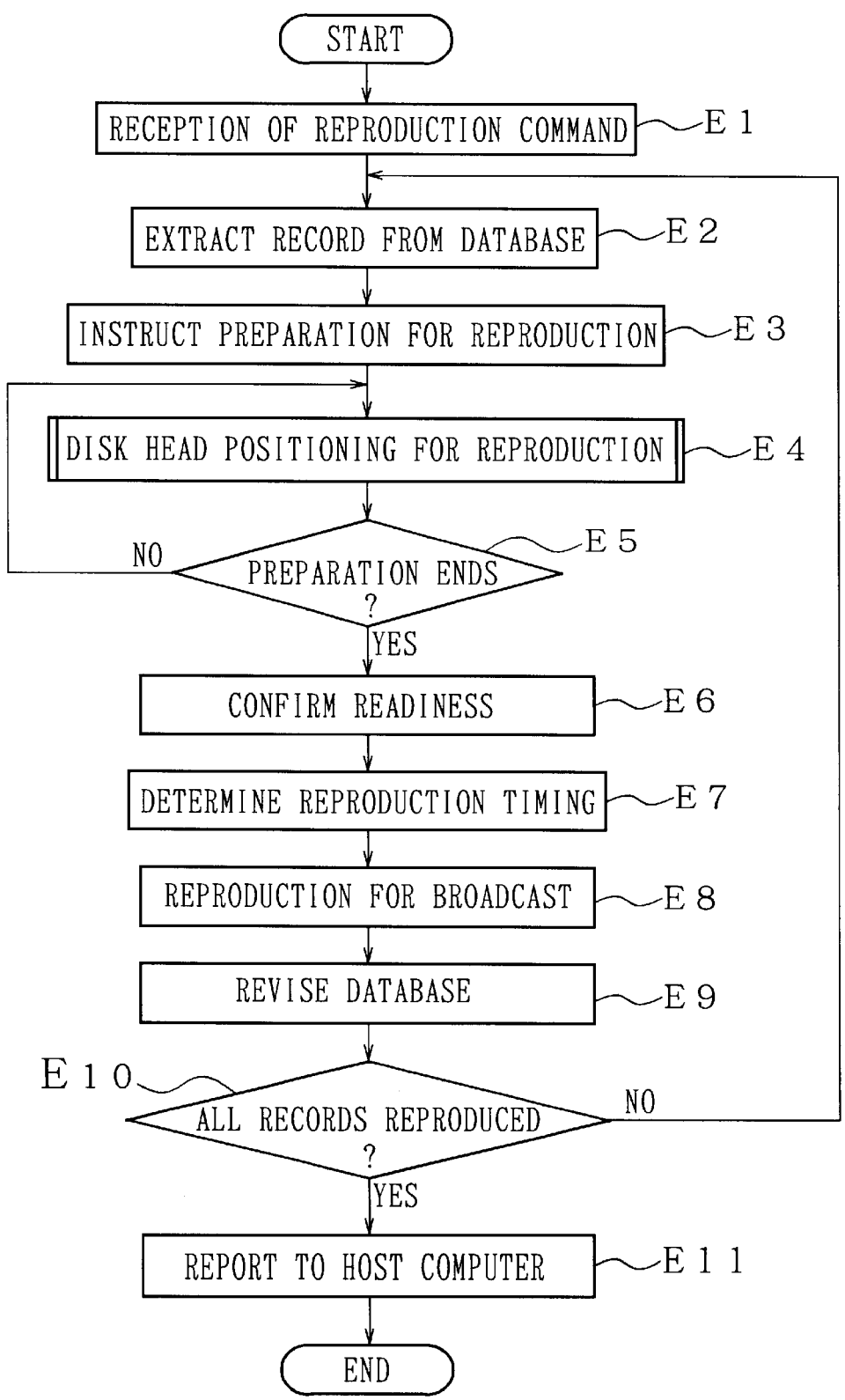
FIG. 12 is a flowchart of the hard disk reproduction process for the AV information.

This AV information reproduction process will be explained in connection with step P7 in FIG. 6 and with reference to the flowchart of FIG. 12. In case the AV information D0 of the server 100 is reproduced for broadcasting, the first step E1 on the flowchart of FIG. 12 waits for the transfer from the host computer 400 or the operator of the play list information D6 including information indicative of the broadcast of the AV information stored in the server. The play list information D6 transferred from the host computer 400, for example, to the application terminal 31 is registered in the database 33.

In step E2, the application terminal 31 extracts the record to be reproduced, i.e., AV information D0 that is already recorded on the disk device 40 and also recorded on the cassette tape 50, by checking the record flag D5 in the database 33.

After the record to be reproduced is extracted, the sequence proceeds to step E3, in which the application terminal 31 sends the play list information D6 to the server 100 to direct the preparation for reproduction.

The server 100 which has received the command of reproduction preparation carries out the head positioning on the disk in step E4. Head positioning on the disk is identical to that of step B4 in FIG. 9, and the explanation thereof is omitted. After the preparation for reproduction of the server 100 finishes in step E5 and the application terminal 31 acknowledges the readiness of server 100 in step E6, the timing of reproduction is determined from the timing of broadcast. The result of timing determination is indicated by the application terminal 31 to the server controller 11 in step E7.

The server controller 11 which has received the timing signal makes reference to the time code TC and sends the recording and/or reproducing start signal S2 to the disk driver 13 in the same manner as the filing process explained previously. The AV information D0 is reproduced from the disk device 40 in the server 100 in response to the recording and/or reproducing start signal S2 in step E8, and it is transferred to the transmission unit (not shown) for broadcasting.

At each reproduction (and broadcast) of the AV information D0 for a broadcast program or the like, the application terminal 31 revises the contents of database 33 in step E9. The application terminal 31 determines the completion of reproduction of all records in step E10. If reproduction is not yet finished, the sequence returns to step E2 to continue the reproduction process.

On completion of reproduction, the sequence proceeds to step E11, in which the application terminal 31 sends the reproduction result information D13 indicative of the end of reproduction to the host computer 400. In this manner, the AV information D0 recorded in the server 100 is reproduced for broadcasting.

(5) Reproduction of AV Information in Auto-changer (Tape Reproduction Mode)

Figure 13:
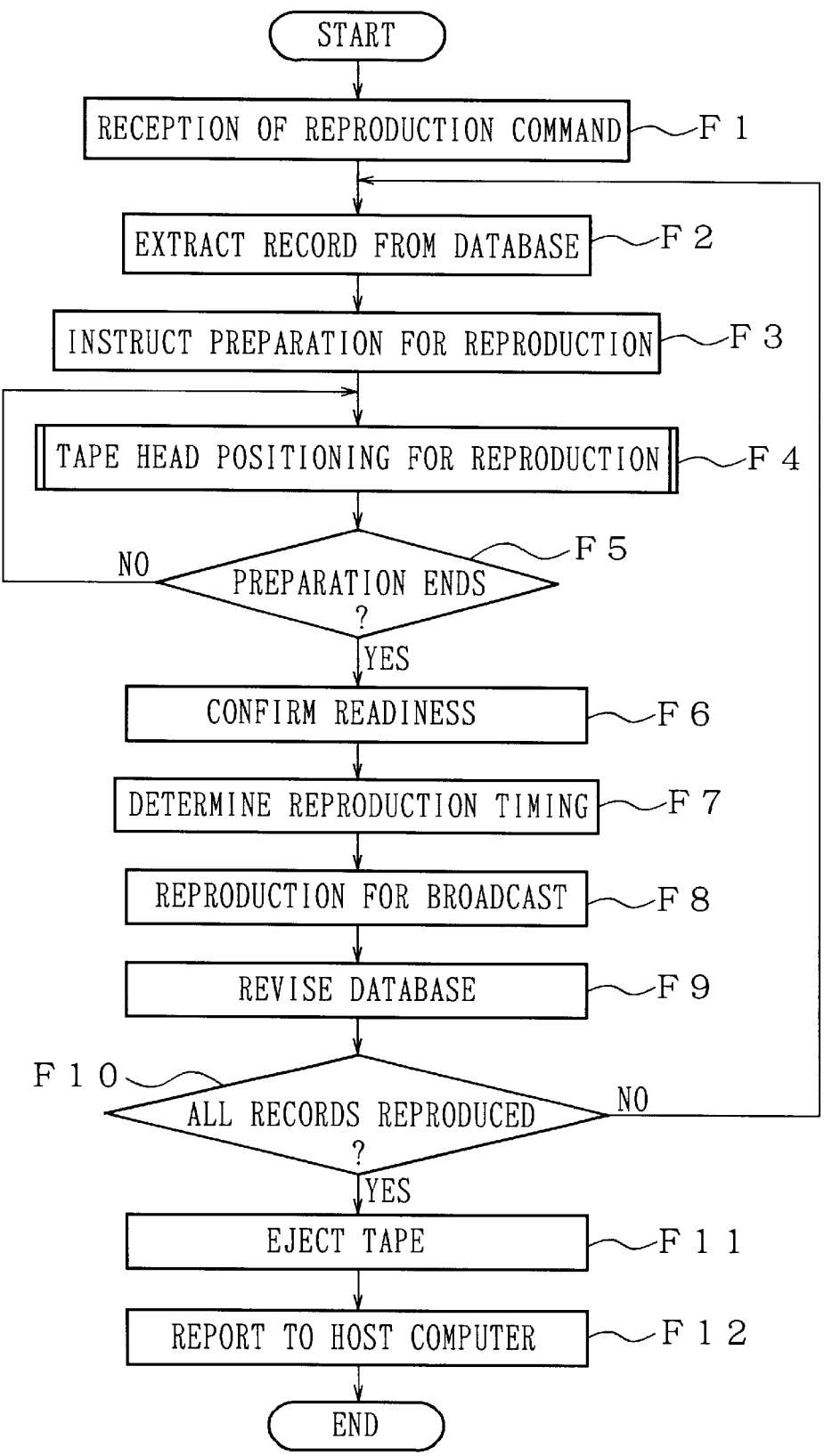
FIG. 13 is a flowchart of the tape reproduction process for the AV information.

This AV information reproduction process will be explained in connection with step P8 in FIG. 6 and with reference to the flowchart of FIG. 13. The recording and/or reproducing system is capable of reproducing the AV information D0 from the cassette tape 50 in the auto-changer 200 so that the broadcasting station can broadcast the revival of old broadcast programs and the like which have been produced in the past. For this operation, the first step F1 on the flowchart of FIG. 13 waits for the transfer from the host computer 400 or the operator of the play list information D6 indicative of the broadcast of the AV information stored in the auto-changer. The play list information D6 transferred from the host computer 400, for example, to the application terminal 31 is registered in the database 33.

In step F2, the application terminal 31 extracts the record to be reproduced, i.e., AV information D0 that is absent on the disk device 40 but is resident on the cassette tape 50, by checking the record flag D5 in the database 33.

After the record is extracted, the sequence proceeds to step F3, in which the application terminal 31 sends the play list information D6 to the application terminal 32 to direct the auto-changer 200 to prepare for reproduction.

The auto-changer 200 which has received the reproduction command carries out the head positioning of the tape in step F4. The head positioning on the tape is identical to that of step B6 in FIG. 9, and the explanation thereof is omitted. After the preparation for reproduction of the auto-changer 200 finishes in step F5 and the application terminal 32 acknowledges the readiness of auto-changer 200 and indicates it to the application terminal 31 in step F6, the timing of reproduction is determined by the application terminal 31 from the timing of broadcast. The result of timing determination is indicated by the application terminal 31 to the application terminal 32 and auto-changer 200 in step F7.

The VTR controller 24 of the auto-changer 200 which has received the timing signal activates the recording and/or reproducing start signal S7 with reference to the time code TC as explained in connection with step B9 of FIG. 9, and sends it to the VTR 26.

The VTR 26 which has received the recording and/or reproducing start signal S7 reproduces the AV information D0 in response to the recording and/or reproducing start signal S7 in step F7, and it is transferred to the transmission unit (not shown) for the revival broadcast.

At each reproduction (and broadcast) of the AV information D0 for a broadcast program or the like, the application terminal 31 revises the contents of database 33 in step F9. The application terminal 31 determines the completion of reproduction of all records in step F10. If reproduction is not yet finished, the sequence returns to step F2 to continue the reproduction process.

On completion of reproduction for all records, the sequence proceeds to step F11, in which the cassette tape 50 is ejected from the VTR 26 (for the tape ejecting operation, refer to step B13 of FIG. 7).

In the last step F12, the application terminal 31 sends the reproduction result information D13 indicative of the end of reproduction to the host computer 400. In this manner, the AV information D0 stored in the auto-changer 200 is reproduced for the revival broadcast.

(6) Restoration of AV Information (Restoration Mode)

The AV information restoring process will be explained in connection with step P9 in FIG. 6 and with reference to the flowchart of FIG. 14 and FIG. 15. The recording and/or reproducing system is capable of recovering a read-error portion of AV information on the disk device 40 or restoring old AV information, which has been erased from the disk device 40 for the purpose of reserving another recording area, based on the AV information D0 saved in the record preserve area B of the cassette tape 50.

Figure 14:
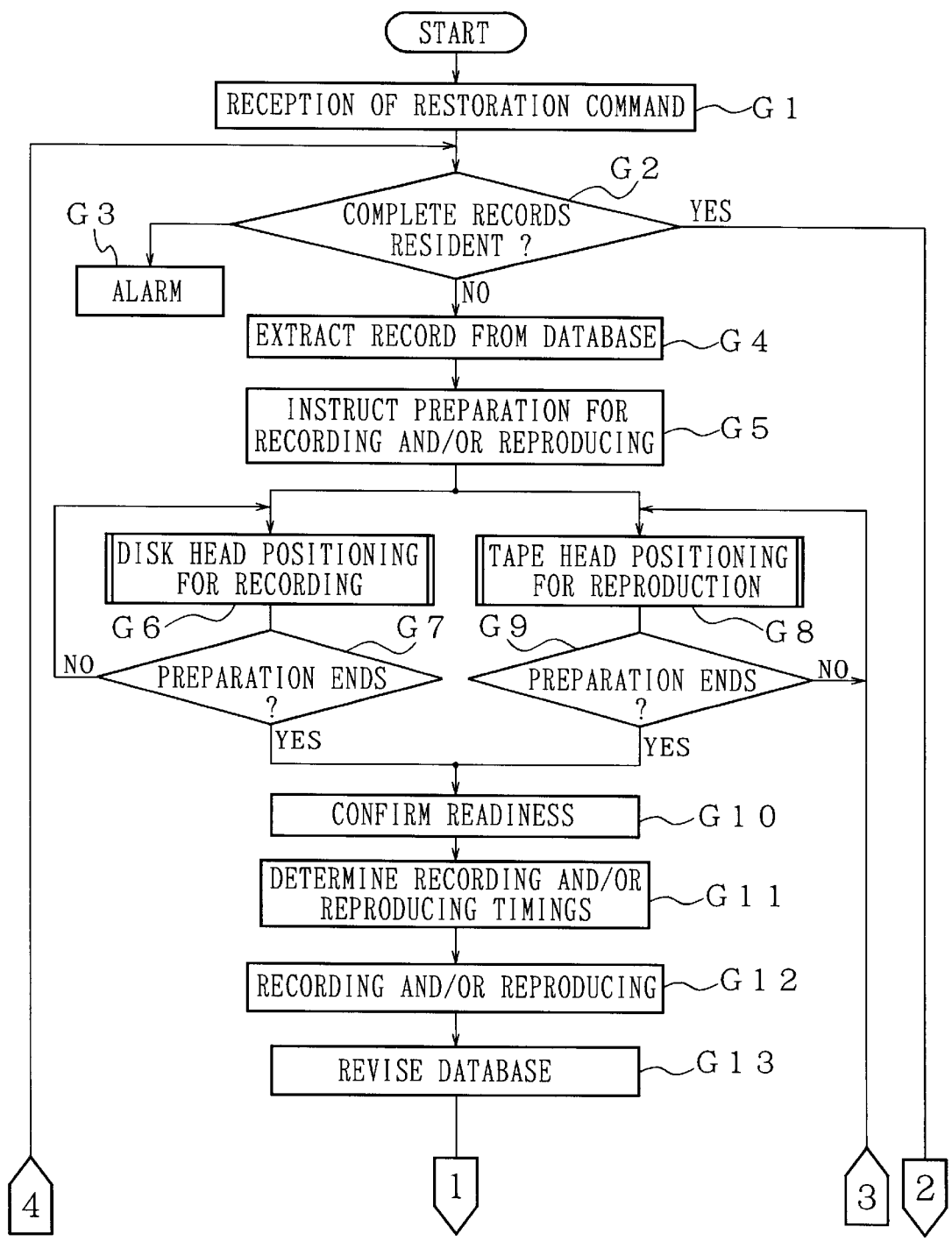
FIG. 14 is a flowchart (part 1) of the restoring ;process for the AV information.
Figure 15:
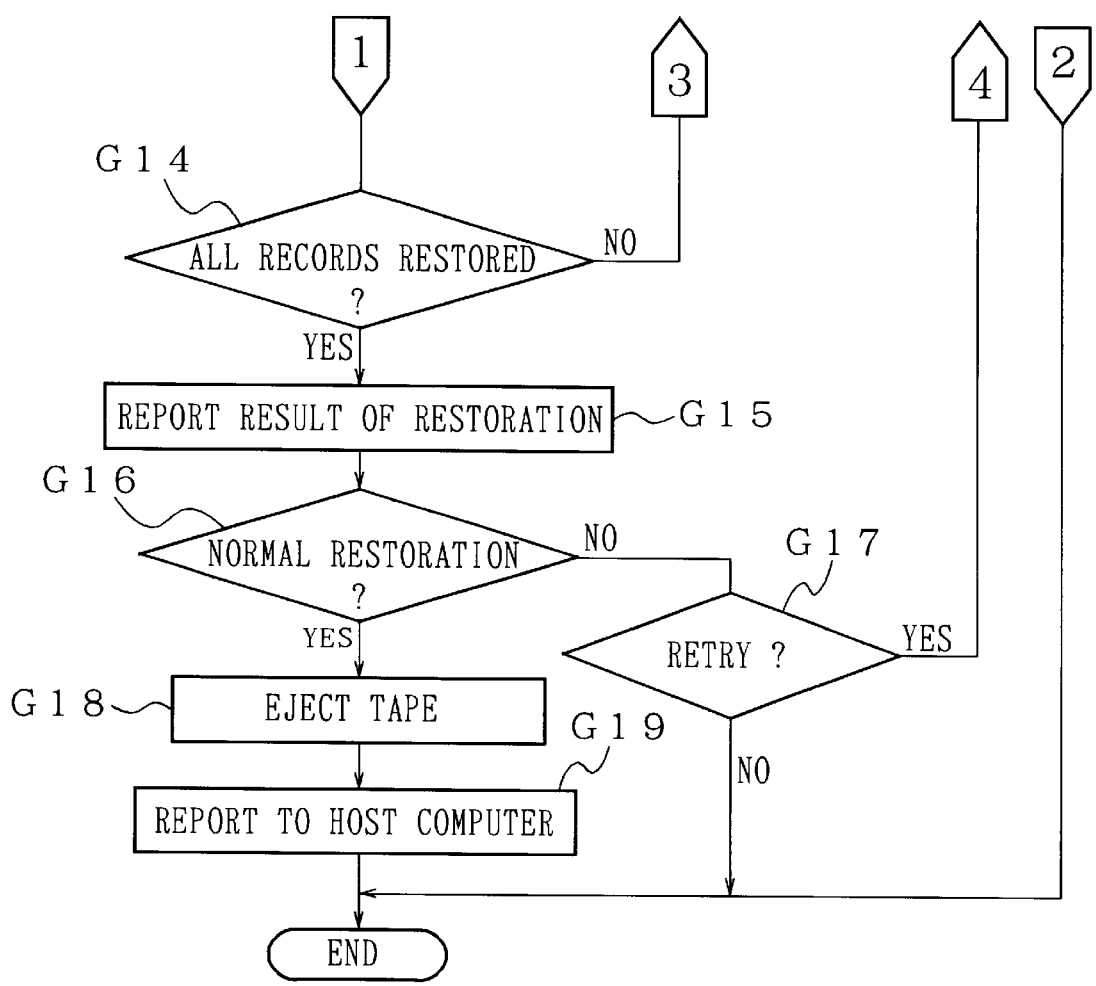
FIG. 15 is a flowchart (part 2) of the restoring process for the AV information.

For this operation, the first step G1 on the flowchart of FIG. 14 waits for the transfer of the play list formation D6 from the host computer 400 or the operator. The play list information D6 transferred from the host computer 400 or entered by the operator on the operation terminal 34 to the application terminal 31 is registered in the database 33.

After the play list information D6 is read out of the database 33 into the application terminal 31, the next step G2 checks based on the search in the database 33 as to whether or not complete records of AV information D0 specified by the information D6 are resident on the disk device 40. If complete records are resident on the disk device 40, in which case the restoring process is not needed, the record restoring process is aborted. The following explains the record restoring process for recovering a read-error portion of AV information on the disk device 40.

In case the AV information D0 is inconsistent with the record on the disk device 40 due to a readout error, step G3 sends an audible or visual alarm signal to the operation terminal 34, and the sequence proceeds to step G4 to carry out the restoring process for the AV information D0.

In step G4, the application terminal 31 extracts the AV information D0 used to recover the read-error portion from the database 33 by making reference to the record flaged D5.

In the next step G5, the application terminal 31 sends the restoration command information D9 to the server 100 and application terminal 32 to direct the preparation for the record restoring process.

In step G6, the server 100 implements the head positioning of the disk. Specifically, the server controller 11 which has received the restoration command information D9 controls the switcher 12 and disk driver 13 (refer to disk head positioning of step B4 in FIG. 9). Consequently, the recording head of the disk driver 13 is moved to the cross point of the read-error portion, and the preparation for recording of the server 100 finishes.

In parallel to this operation, the application terminal 32 which has received the restoration command information D9 reads out a control program from the ROM in step G8, by which the auto-changer controller 21 and VTR controller 24 are controlled (refer to tape head positioning of step B6 in FIG. 9). Consequently, a cassette tape 50 is loaded onto the VTR 26, and head positioning in the recording area of the read-error portion takes place. The operation mode is switched from recording mode to reproduction mode by the switcher 25, and the preparation for reproduction of the auto-changer 200 finishes.

After the preparation for recording of the server 100 and reproduction of the auto-changer 200 finish in steps G7 and G9, respectively, and the application terminal 31 acknowledges the readiness of recording and reproduction in step G10, the timing of recording and reproduction of both devices is determined. The result of timing determination is indicated to the server controller 11 and application terminal 32 in in step G11.

The server controller 11 which has received the timing signal makes reference to the time code TC and sends the recording and/or reproducing start signal S2 to the disk driver 13 in the same manner as the filing process explained previously. Similarly, the VTR controller 24 makes reference to the time code TC and sends the recording and/or reproducing start signal S7 to the VTR 26.

The AV information D0 for the read-error portion is reproduced from the auto-changer 200 in response to the recording and/or reproducing start signal S7 in step G12, and it is transferred to the server 100 through the on-line 70 and recorded onto the disk device 40 in response to the recording and/or reproducing start signal S2. Consequently, the AV information D0 which is rid of the read-error portion is restored.

At each recovery of read-error portion of a source record for abroad cast program or the like, the application terminal 31 revises the contents of database 33, i.e., record flag D5, in step G13. The application terminal 31 determines the completion of restoration of all source records in step G14. If restoration is not yet finished, the sequence returns to steps G6 and G8 to continue the record restoring process.

On completion of restoration for all source records, the sequence proceeds to step G15, in which the application terminal 32 sends the restoration result information D10 to the application terminal 31. The application terminal 31 which has received the restoration result information D10 checks the result of restoration process in step G16.

When the restoration result is determined to be normal, the sequence proceeds to step G18, in which the cassette tape 50 is ejected from the VTR 26 (for the tape ejecting operation, refer to step B13 in FIG. 9). In the last step G19, the application terminal 31 sends the reproduction result information D13 indicative of the end of restoration to the host computer 400.

In case the result of restoring process is determined to be abnormal, the sequence branches to step G17, in which the record is invalidated and the application terminal 31 waits for a command as to whether restoration is retried immediately or carried out later. In response to the command of immediate recurrent restoring process, the sequence returns to step G2 to carry out the restoring process again. In response to the command of later restoring process, the sequence proceeds to step G17, in which the cassette tape 50 is ejected and application terminal 31 sends the reproduction result information D13 indicative of the unsuccessful restoration to the host computer 400.

In this manner, at the emergence of a read-error record portion (miss-reproduction portion) on the disk device 40, the recording and/or reproducing system reproduces the corresponding record portion from the cassette tape 50 and records it onto the disk device 40: (record restoring process).

Based on this restoring process, the operator can run the server 100 without being conscious of as to which of the disk device 40 or cassette tape 50 is the AV information D0 resident. Accordingly, the disk device 40 has its recording capacity virtually expanded. The more the recording capacity of cassette tapes 50 relative to the disk device 40, the greater is the effectiveness of the restoration function.

(7) Serializing of AV Information on Tape(s) (Edit Mode)

The AV information record serializing process will be explained in connection with step P10 in FIG. 6 and with reference to the flowchart of FIG. 16 and FIG. 17. This recording and/or reproducing system is capable of serializing source records for images of program and commercial, which are recorded at random in the server 100, in the order of broadcasting on a cassette tape(s) 50. In this process, a cassette tape(s) 50 that is assigned to the record preserve area B of the auto-changer 200 is used.

Figure 16:
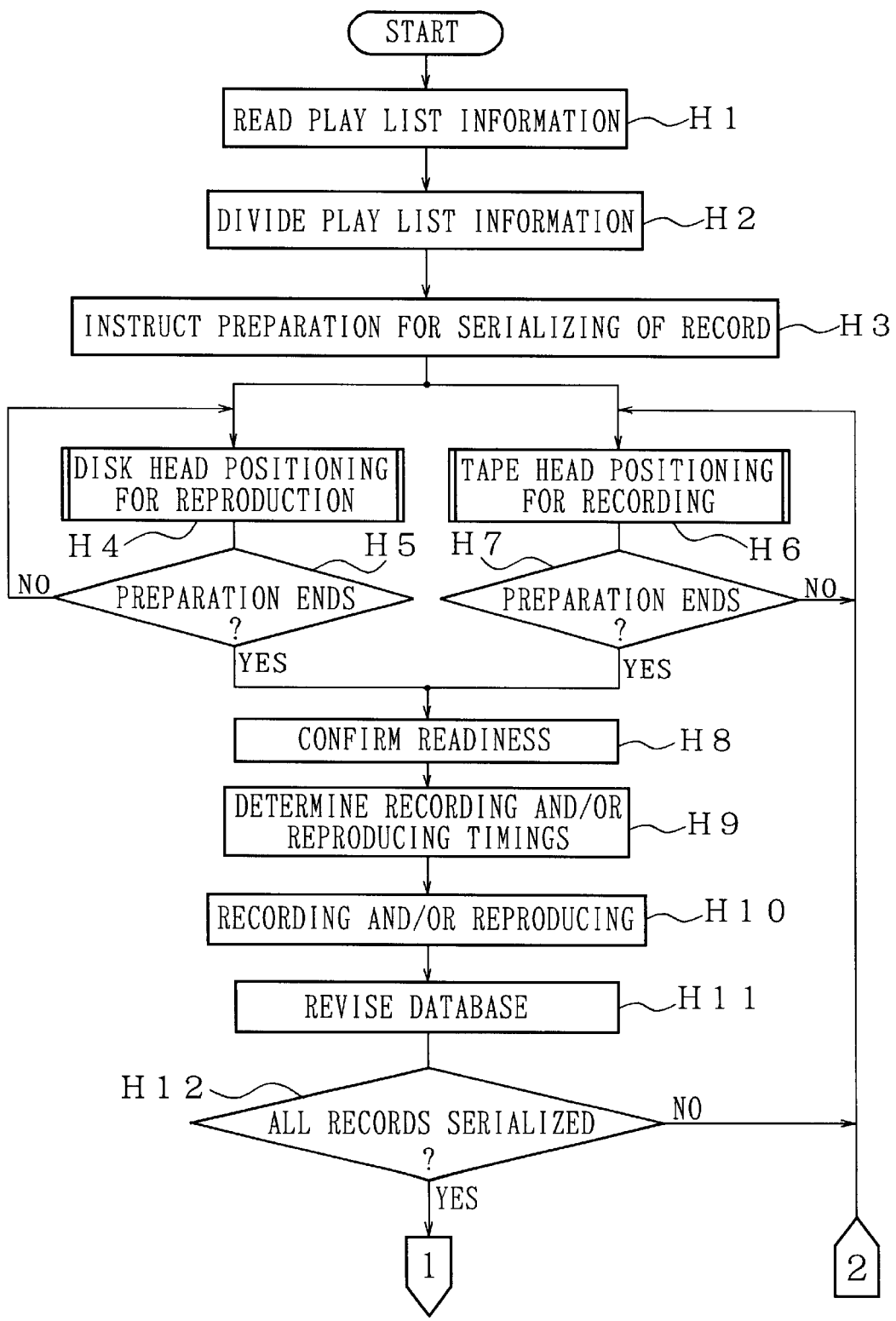
FIG. 16 is a flowchart (part 1) of the serializing process for the AV information.

The first step H1 on the flowchart of FIG. 16 waits for the transfer from the host computer 400 or the operator of the play list information D6 including information indicative of the serializing of records. The play list information D6 transferred from the host computer 400, for example, to the application terminal 31 is registered in the database 33.

The play list information D6 instructs the order of reproduction of the AV information D0 including images of program and commercial at the time of broadcasting so that the AV information is re-recorded in the order of reproduction at broadcasting. The order of reproduction of the AV information D0 may be instructed by the operator through the operation terminal 34.

In step H2, the application terminal 31 divides the records of the AV information D0 on the disk device 40 depending on the play list information D6 so that the records are re-recorded onto one or more cassette tapes 50. It is because AV information D0 can be recorded only for a predetermined time in the cassette tape 50. The AV information D0 necessary for the hard disc 40 is naturally present for serializing the AV information D0 in the order of reproduction at the time of broadcasting.

In the subsequent step H3, the application terminal 31 sends the serializing command information D11 to the server 100 and application terminal 32 thereby to direct the preparation for serializing. That is, the server 100 is directed by the host computer 400 in step H3 to carry out the record serializing process.

In step H4, the server 100 implements the head positioning of the disk. Specifically, the server controller 11 which has received the record serializing command information D11 controls the switcher 12 and disk driver 13 (refer to disk head positioning of step B4 in FIG. 9). Consequently, the reproduction head of the disk driver 13 is moved, and the preparation for reproduction of the server 100 finishes.

In parallel to this operation, the application terminal 32 which has received the record serializing command information D11 reads out a control program from the ROM in step H6, by which the auto-changer controller 21 and VTR controller 24 are controlled (refer to tape head positioning of step B6 in FIG. 9). Consequently, the first cassette tape 50 is loaded onto the VTR 26, the operation mode is switched from reproduction mode to recording mode by the switcher 25, and the preparation for recording of the auto-changer 200 finishes.

After the preparation for reproduction of the server 100 and recording of the auto-changer 200 finish in steps H5 and H7, respectively, and the application terminal 31 acknowledges the readiness of recording and reproduction in step H8, the timing of recording and reproduction of both devices is determined. The result of timing determination is indicated to the server controller 11 and application terminal 32 in in step H9.

The server controller 11 which has received the timing signal makes reference to the time code TC and sends the recording and/or reproducing start signal S2 to the disk driver 13 in the same manner as the filing process explained previously. Similarly, the VTR controller 24 makes reference to the time code TC and sends the recording and/or reproducing start signal S7 to the VTR 26.

The AV information D0 on the disk device 40 in the server 100 is reproduced in response to the recording and/or reproducing start signal S2 in step H10, and it is transferred to the auto-changer 200 through the on-line 70 and recorded onto the first cassette tape 50 in response to the recording and/or reproducing start signal S7.

In case the AV information D0 of one source record is too large to be recorded completely on the first cassette tape 50, the first cassette tape 50 is replaced with the second cassette tape 50 and the AV information D0 is recorded onto it continuously. The third and following cassette tapes 50 will be used in this manner.

After each source record is recorded onto one or more cassette tapes 50, the application terminal 31 revises the contents of database 33. Specifically, attribute information indicative of the first-place reproduction is registered for the first cassette tape 50, and attribute information indicative of the second and following reproduction are registered for the second and following cassette tapes 50.

By loading the cassette tapes 50 sequentially in accordance with the registered attribute information, the AV information D0 can be reproduced in order at the time of broadcasting.

Instep H12, if the AV information D0 to be serialized, e.g., an image of commercial to be broadcast following the image of program, is left, the sequence returns to steps H4 and H6 to continue the recording and/or reproducing process for the serializing of records. In this case, the image of commercial is recorded continuously onto the cassette tape 50 on which the image of program has been recorded last.

Figure 17:
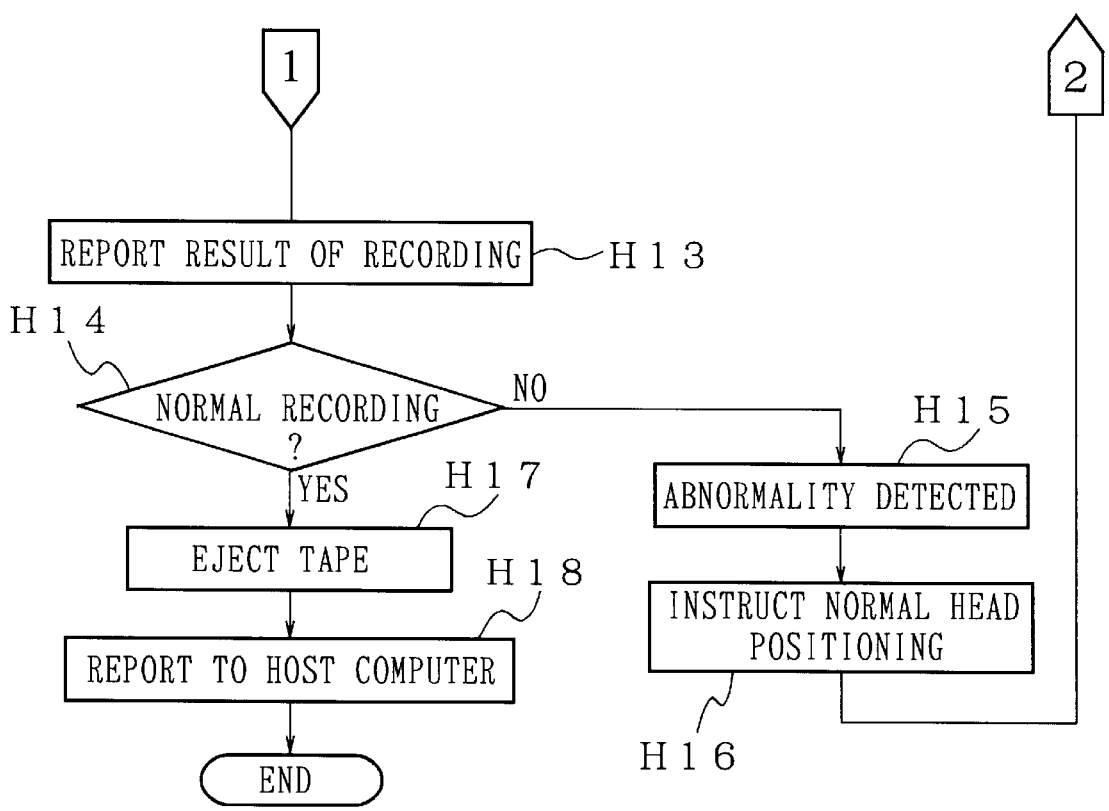
FIG. 17 is a flowchart (part 2) of the serializing process for the AV information.

On completion of recording of all source records, the application terminal 32 sends the recording result information D12 to the application terminal 31 in step H13 on the flowchart of FIG. 17.

The application terminal 31 which has received the recording result information D12 checks the normality of record serializing process in step H14. When the record serializing process is determined to be normal, the sequence proceeds to step H17, in which the last cassette tape 50 is ejected from the VTR 26. In the last step H18, the serializing result information D12 indicative of the end of serializing is sent to the host computer 400.

In case the result of serializing process is determined to be abnormal, the sequence branches to step H15, in which the application terminal 31 detects the abnormal portion. In the subsequent step H16, the application terminal 31 directs the server 100 to return the recording head to the disk head position (normal position) before the abnormality has been detected and directs the application terminal 32 to rewind the tape up to the tape head position (normal position) before the abnormality has been detected.

The server 100 which has received the command moves the recording head to the disk head position before the abnormality has been detected in step H4 and the auto-changer 200 which has received the command implements the head positioning of the tape in step H6. The recording process on the cassette tape 50 takes place again.

In this manner, the recording and/or reproducing system of this embodiment performs the automatic serializing of source records on a cassette tape (s) in the order of broadcasting by using one VTR 26, while replacing the cassette tapes 50 automatically.

As described above, the hybrid recording and/or reproducing apparatus of this embodiment implements automatically the three processes including the copy process, restoring process and serializing process for the AV information D0, whereby human errors can be minimized and the efficiency of the AV information recording and/or reproducing work can be improved significantly.

Although the hybrid recording and/or reproducing apparatus of the foregoing embodiment has two separate application terminals 31 and 32 which control the server 100 and auto-changer 200, respectively, it may have a single application terminal which controls both devices 100 and 200.

Although the hybrid recording and/or reproducing apparatus of the foregoing embodiment has one server 100 and one auto-changer 200, it may have multiple servers 100 and auto-changers 200 each incorporating an individual switcher 12 and disk driver 13 and an individual switcher 25 and VTR 26, respectively.

With the provision of multiple VTRs 26, it becomes possible to increase the number of records of AV information D0 which undergo the filing process simultaneously in unison with the disk device 40, and accordingly reduce records which need to be copied. There is no limit in the number of cassette tapes 50 stacked on the medium rack 22.

Although the hybrid recording and/or reproducing apparatus of the foregoing embodiment has the divided auto-changer controller 21 and VTR controller 24 which control the VTR 26 and elevator 23 separately, it may have a single controller which controls both devices 26 and 23.

Although the hybrid recording and/or reproducing apparatus of the foregoing embodiment runs the disk driver 13 and VTR 26 for recording and reproduction based on the timings derived from the time code TC, an alternative design is to time the operations of these devices to a certain detectable signal, e.g., GIP signal.

Although the hybrid recording and/or reproducing apparatus of the foregoing embodiment has its database 33 containing the itmes listed in Table 1 as an example, itmes can be determined arbitrarily depending on each system operation obviously.

Although the hybrid recording and/or reproducing apparatus of the foregoing embodiment has its server 100 and auto-changer 200 connected through the on-line 70, an alternative design is to connect a LAN bus 60 to the auto-changer 200 so that various information used for the recording and reproduction of the AV information D0 is transacted through the bus.

As described above, the inventive hybrid recording and/or reproducing apparatus is designed to use digital information, which has been saved for the backup purpose on the tape recording medium, as part of digital information to be recorded on the disk recording medium. Accordingly, in the event of readout failure of the disk recording medium, it is possible to restore the record in the state before the occurrence of failure on the disk recording medium based on the backup record in a short time, whereby the reliability of the apparatus as a recording and/or reproducing system is improved significantly.

The inventive hybrid recording and/or reproducing apparatus adopts the combination of the server 100 with a relatively small recording capacity and the auto-changer 200 so that frequently-used AV information is recorded in the server 100 and AV information to be preserved is recorded in the auto-changer 200, whereby it becomes possible to record more AV information than the recording capacity of the server 100. In addition, it becomes possible to reduce the medium cost per unit recording capacity.

The inventive hybrid recording and/or reproducing apparatus is extremely suitable for use in broadcasting stations and the like where recording and/or reproducing apparatus are required to record and store a large quantity of video and audio information and read out the stored information at a high readout speed.

What is claimed is:

1. A digital information recording and/or reproducing apparatus for recording and reproducing digital information including an audio signal and/or video signal, said apparatus comprising:

first recording and/or reproducing means which records and/or reproduces the digital information on a nonlinear-access recording medium;

second recording and/or reproducing means which records and/or reproduces the digital information on a tape recording medium having a recording capacity which is greater than the recording capacity of said nonlinear-access recording medium; and control means which controls said first and second recording and/or reproducing means such that when said nonlinear-access recording medium has its vacant area decreasing below a prescribed capacity, the digital information on said nonlinear-access recording medium is erased so that the erased area is added to the vacant area until the vacant area regains the prescribed capacity, and the digital information, which is erased from said nonlinear-access recording medium, is recorded onto said tape recording medium.

2. A digital information recording and/or reproducing apparatus according to claim 1, wherein said tape recording medium has its recording area divided into a first area and a second area, said control means controlling said first and second recording and/or reproducing means to record the digital information recorded on said nonlinear-access recording medium into said first area and record the digital information, which is erased from said nonlinear-access recording medium, into said second area.

3. A digital information recording and/or reproducing apparatus according to claim 2, wherein said control means controls said first and second recording and/or reproducing means to record the digital information, which is accessed infrequently or is erased from said nonlinear-access recording medium, into said second area of said tape recording medium.

4. A digital information recording and/or reproducing apparatus according to claim 1, wherein said control means controls said first and second recording and/or reproducing means such that in reproducing the digital information from said nonlinear-access recording medium by said first recording and/or reproducing means, if the digital information to be reproduced is absent on said nonlinear-access recording medium but is resident on said tape recording medium, the digital information is reproduced from said tape recording medium and recorded onto said nonlinear-access recording medium.

5. A digital information recording and/or reproducing apparatus according to claim 1, wherein said first recording and/or reproducing means includes:

a plurality of input ports and output ports; and a first controller which controls said input ports and output ports to introduce and release the digital information based on the assignment of time slots, the digital information introduced by said input ports being recorded onto said nonlinear-access recording medium under control of said first controller, the digital information reproduced from said nonlinear-access recording medium being released by said output ports under control of said first controller.

6. A digital information recording and/or reproducing apparatus according to claim 1, wherein said second recording and/or reproducing means includes:

a plurality of bins for stacking tape recording mediums;

one or more recording and/or reproducing devices;

a tape carrier which carries a tape recording medium between one of said bins and one of said recording and/or reproducing devices selectively; and a controller which controls said recording and/or reproducing device and said tape carrier to load said tape recording medium carried by said tape carrier onto said recording and/or reproducing device, record and/or reproduce the digital information on said tape recording medium, unload said tape recording medium which has undergone the recording and/or reproduction from said recording and/or reproducing device, and stack said tape recording medium in said bin.

7. A digital information recording and/or reproducing method for recording and/or reproducing digital information including an audio signal and/or video signal on a nonlinear-access recording medium and a tape recording medium having a recording capacity which is greater than the recording capacity of said nonlinear-access recording medium, said method comprising:

a first step of, when said nonlinear-access recording medium has its vacant area decreasing below a prescribed capacity, erasing the digital information on said nonlinear-access recording medium so that the erased area is added to the vacant area until the vacant area regains the prescribed capacity, and recording the digital information, which is erased from said nonlinear-access recording medium, onto said tape recording medium.

8. A digital information recording and/or reproducing method according to claim 7 further including:

a second step of, in reproducing the digital information from said nonlinear-access recording medium if the digital information to be reproduced is absent on said nonlinear-access recording medium but is resident on said tape recording medium, reproducing the digital information from said tape recording medium and recording the reproduced digital information onto said nonlinear-access recording medium.

* * * * *